(12) United States Patent
Baldwin et al.

(10) Patent No.: US 8,650,743 B2
(45) Date of Patent: Feb. 18, 2014

(54) SYSTEM FOR ADJUSTABLY MOUNTING AN ELECTRICAL DEVICE

(75) Inventors: Jeffrey P. Baldwin, Phoenix, AZ (US); Richard L. Cleghorn, Tempe, AZ (US); Nathaniel A. Falendysz, Phoenix, AZ (US); Marcus J. Shotey, Scottsdale, AZ (US); Iven Dieterle, Tempe, AZ (US); Thomas A. Miserendino, Gilbert, AZ (US)

(73) Assignee: Hubbell Incorporated, Shelton, CT (US)

(*) Notice: Subject to any disclaimer, the term of this patent is extended or adjusted under 35 U.S.C. 154(b) by 371 days.

(21) Appl. No.: 12/890,511

(22) Filed: Sep. 24, 2010

(65) Prior Publication Data

US 2011/0067896 A1 Mar. 24, 2011

Related U.S. Application Data

(63) Continuation-in-part of application No. 12/577,648, filed on Oct. 12, 2009, now Pat. No. 8,347,491.

(60) Provisional application No. 61/252,840, filed on Oct. 19, 2009, provisional application No. 61/245,371, filed on Sep. 24, 2009, provisional application No. 61/252,853, filed on Oct. 19, 2009, provisional application No. 61/265,412, filed on Dec. 1, 2009, provisional application No. 61/316,271, filed on Mar. 22, 2010.

(51) Int. Cl.
*B23P 19/00* (2006.01)

(52) U.S. Cl.
USPC ............... 29/756; 29/745; 29/758; 29/764; 174/50; 174/53; 174/58; 174/520

(58) Field of Classification Search
USPC ............... 29/756, 745, 757, 758, 761, 764; 174/50, 53, 57, 58, 66, 520, 565
See application file for complete search history.

(56) References Cited

U.S. PATENT DOCUMENTS

| 1,275,692 | A | | 8/1918 | Hubbell |
| 1,345,502 | A | | 7/1920 | Newton |
| 2,473,051 | A | * | 6/1949 | Carlson ........................ 248/27.1 |
| 3,689,864 | A | | 9/1972 | Glader |
| 4,909,692 | A | | 3/1990 | Hendren |
| 5,012,043 | A | | 4/1991 | Seymour |

(Continued)

FOREIGN PATENT DOCUMENTS

CA 2525352 5/2006

*Primary Examiner* — Thiem Phan
(74) *Attorney, Agent, or Firm* — Alan I. Cantor; Alfred N. Goodman; Mark S. Bicks

(57) ABSTRACT

An adjustably mountable electrical device with one or more yokes coupled to the electrical device, at least one electrically conductive strap, and an electrical device face, wherein a distance between the electrical device face and at least one of the yoke, the strap and an electrical box mounting screw aperture is adjustable after the electrical device is mounted to the electrical box. The system may comprise mounting flanges that may have threaded hubs or the system may further comprise an electric device having front and back shells moveable on a track in response to depression of a button allowing for movement of the back shell so that the electric device may be mounted having its face coplanar with a front wall surface.

12 Claims, 42 Drawing Sheets

(56) References Cited

U.S. PATENT DOCUMENTS

| | | |
|---|---|---|
| 5,108,243 A | 4/1992 | Antonucci |
| 5,289,934 A * | 3/1994 | Smith et al. ............... 220/3.7 |
| 5,603,424 A * | 2/1997 | Bordwell et al. ........... 220/3.5 |
| 5,866,845 A | 2/1999 | Markiewicz |
| 5,921,737 A | 7/1999 | Ibey |
| 6,051,785 A | 4/2000 | Baldwin |
| 6,175,078 B1 | 1/2001 | Bambardekar |
| 6,307,154 B1 | 10/2001 | Gretz |
| 6,468,107 B1 | 10/2002 | Nice |
| 6,820,760 B2 | 11/2004 | Wegner |
| 6,875,922 B1 | 4/2005 | Petak |
| 6,953,894 B2 | 10/2005 | Ungerman |
| 7,002,076 B2 | 2/2006 | Ungerman |
| 7,052,314 B1 | 5/2006 | Rose |
| 7,077,280 B1 | 7/2006 | Gretz |
| 7,112,743 B2 | 9/2006 | Hull |
| 7,193,154 B1 | 3/2007 | Connelly |
| 7,312,395 B1 | 12/2007 | Gretz |
| 7,378,591 B2 | 5/2008 | Dinh |
| 7,410,072 B2 | 8/2008 | Wegner |
| 7,494,371 B2 | 2/2009 | Kidman |
| 7,531,743 B2 | 5/2009 | Johnson et al. |
| 7,544,889 B1 | 6/2009 | Sanchez |
| 7,572,977 B2 | 8/2009 | Gorman |
| 7,582,827 B1 | 9/2009 | Gretz |
| 7,838,769 B2 * | 11/2010 | Peck ............................. 174/58 |

\* cited by examiner

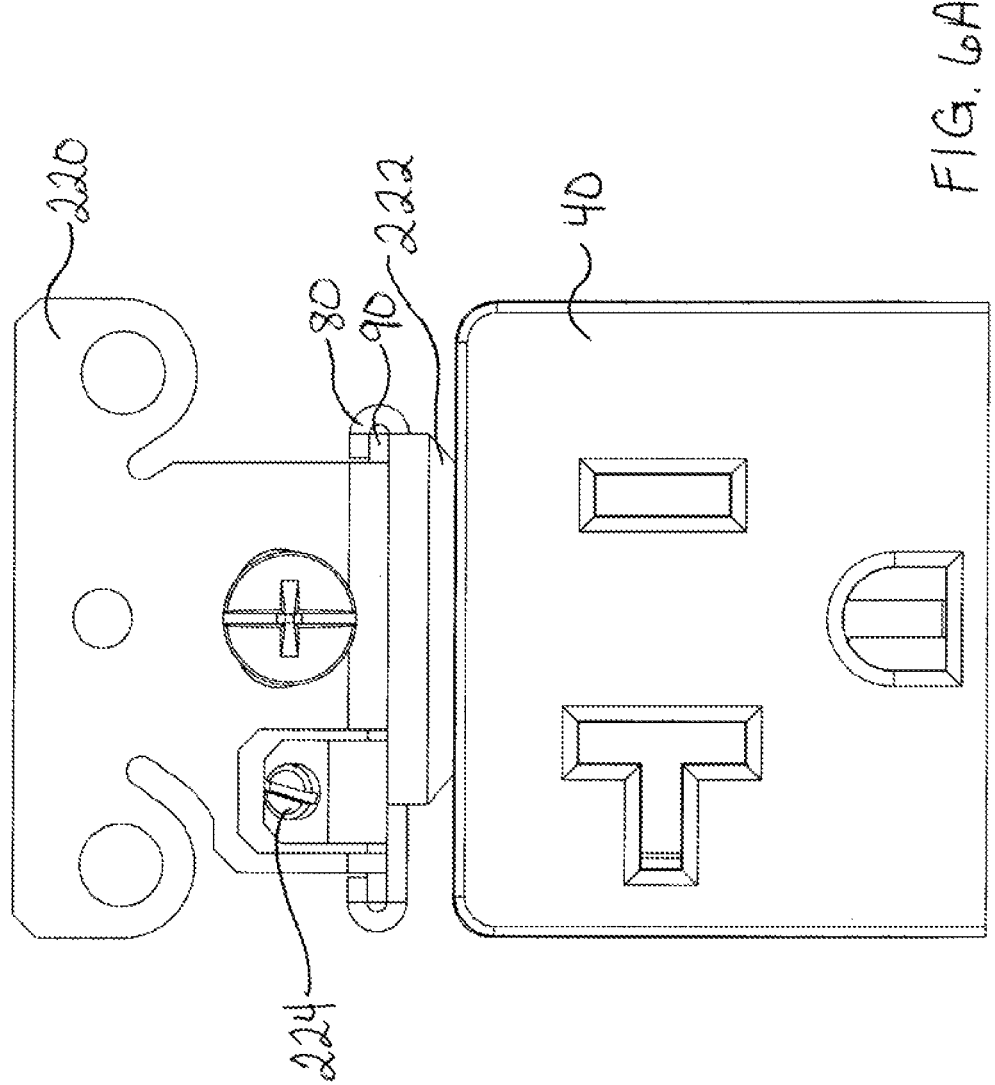

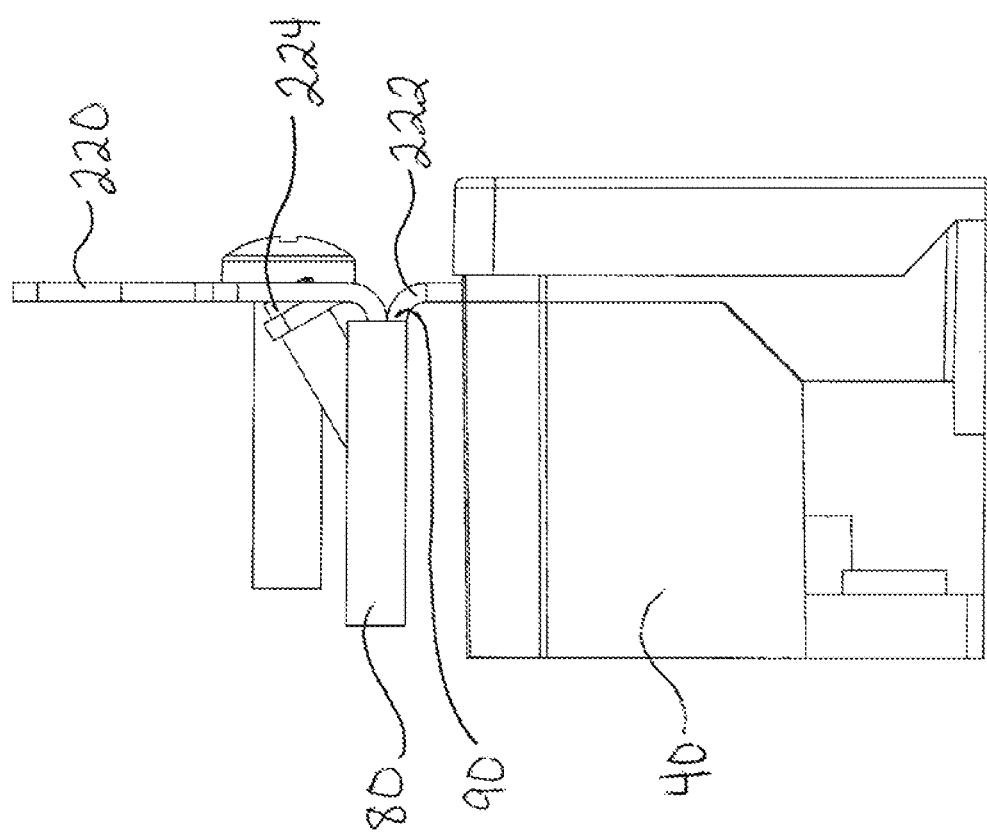

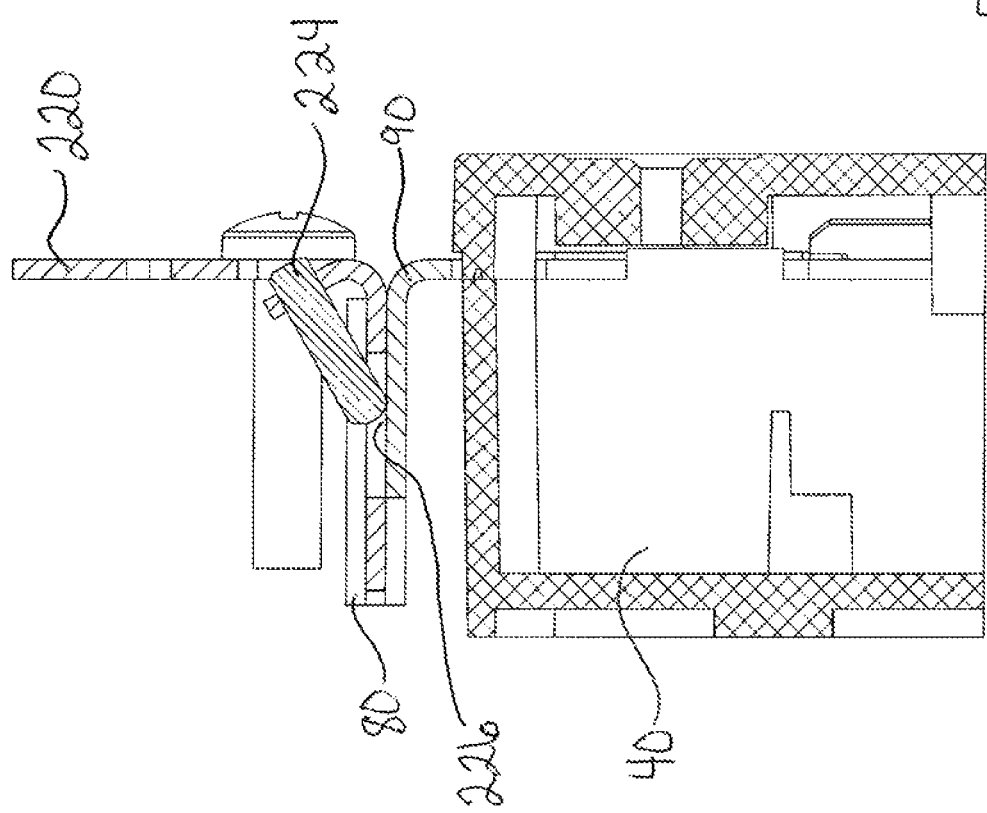

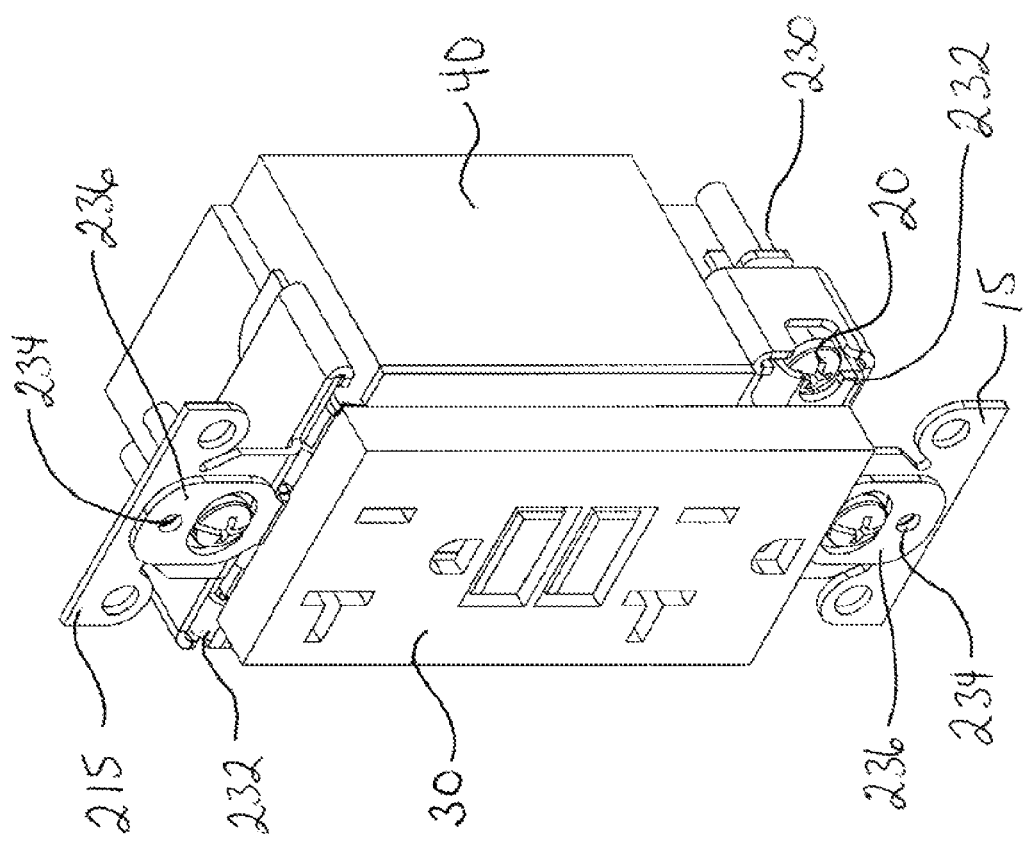

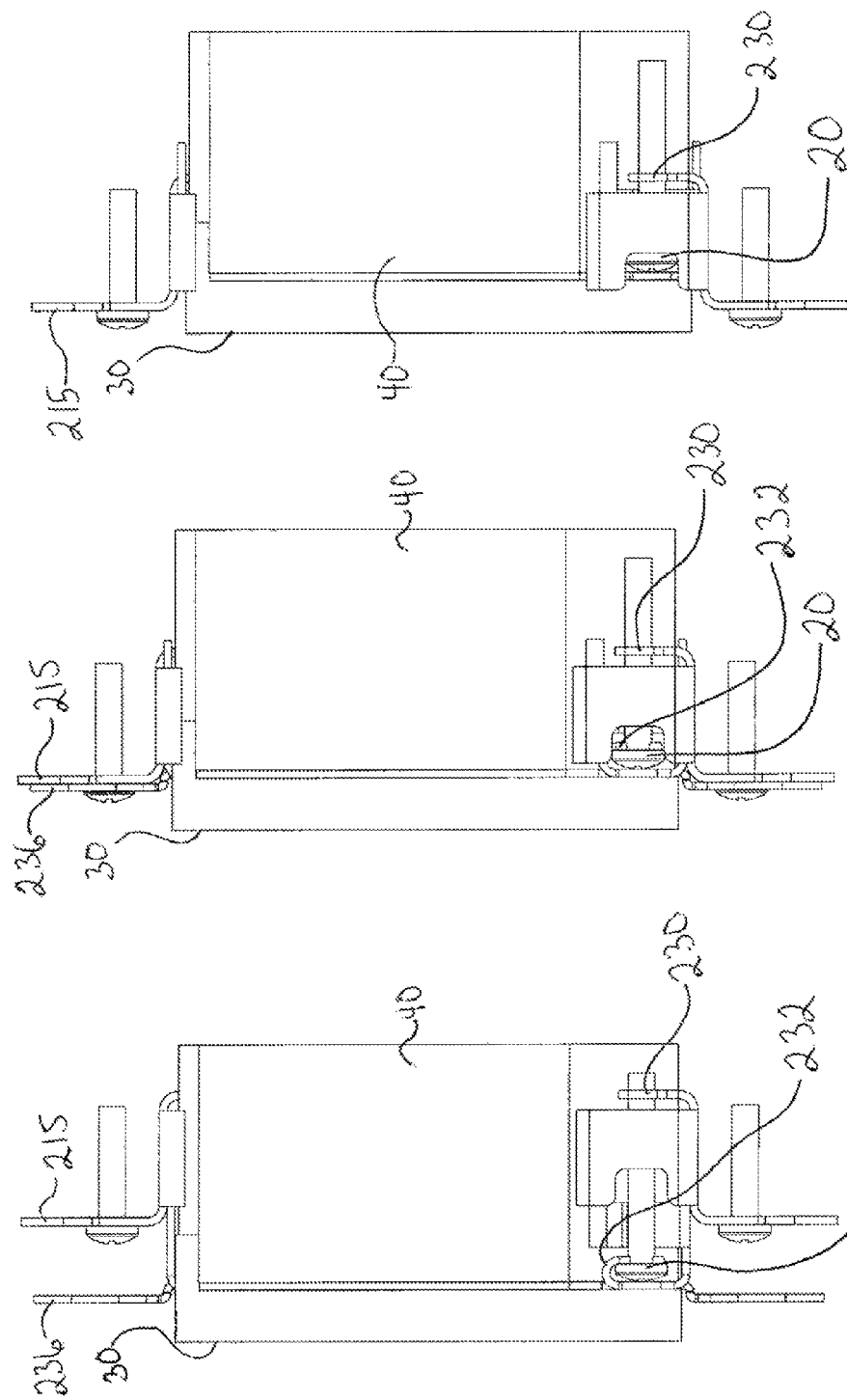

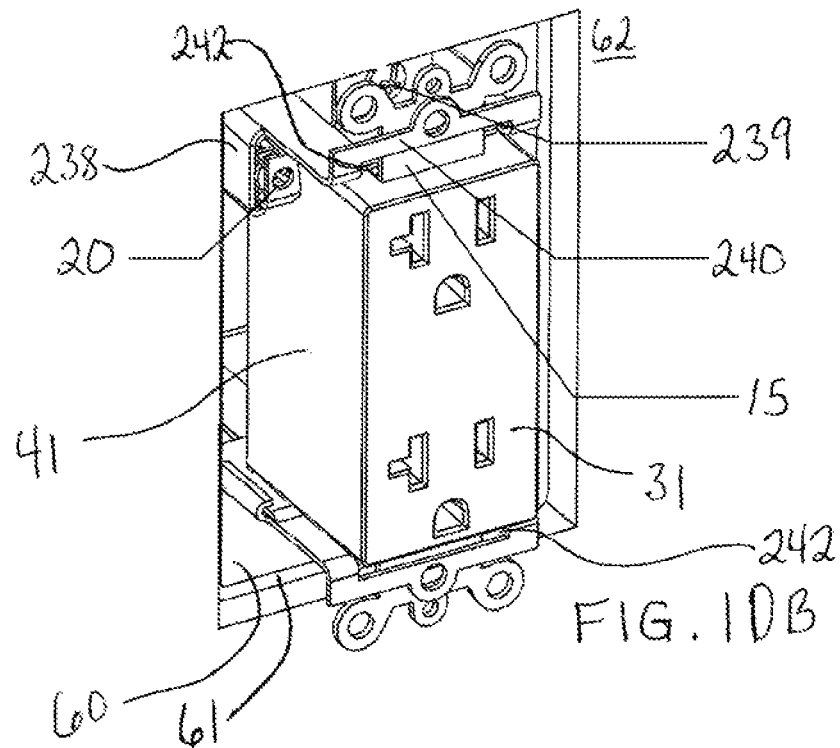
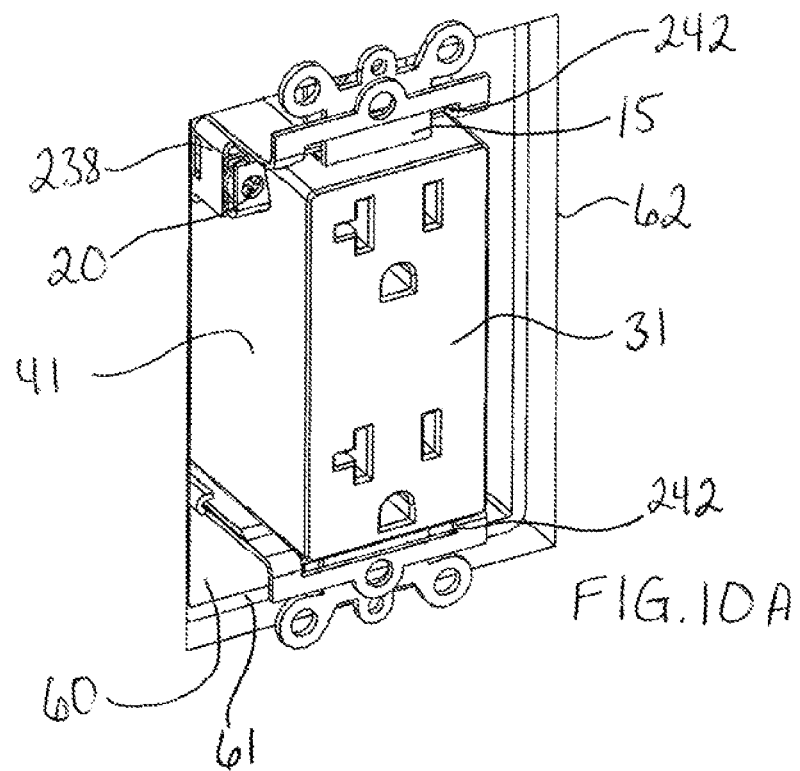

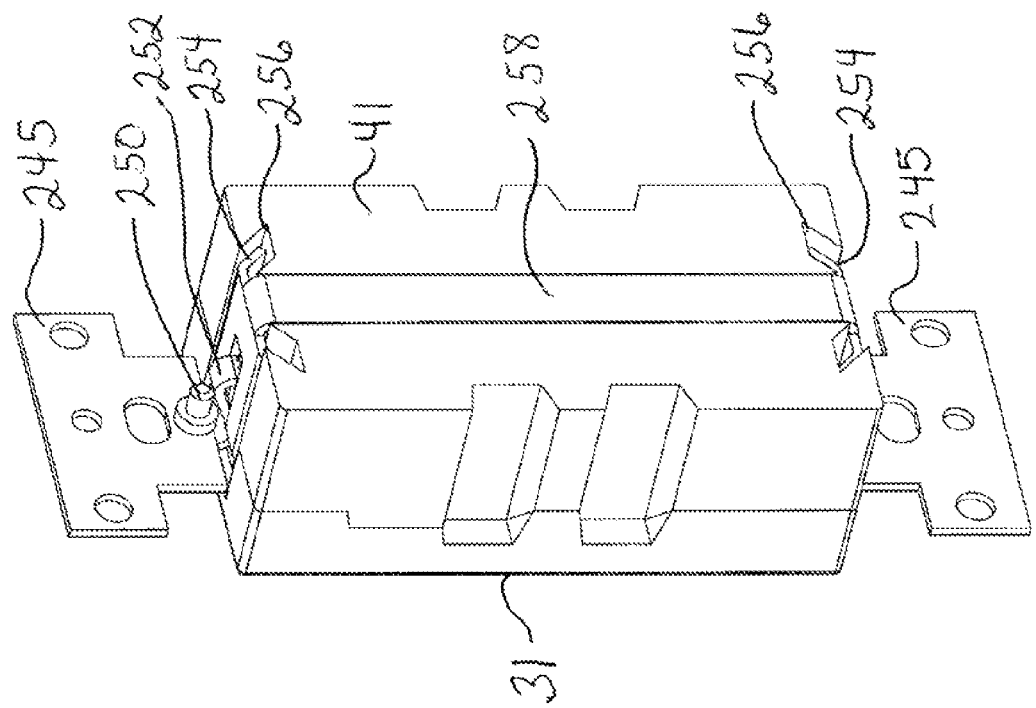
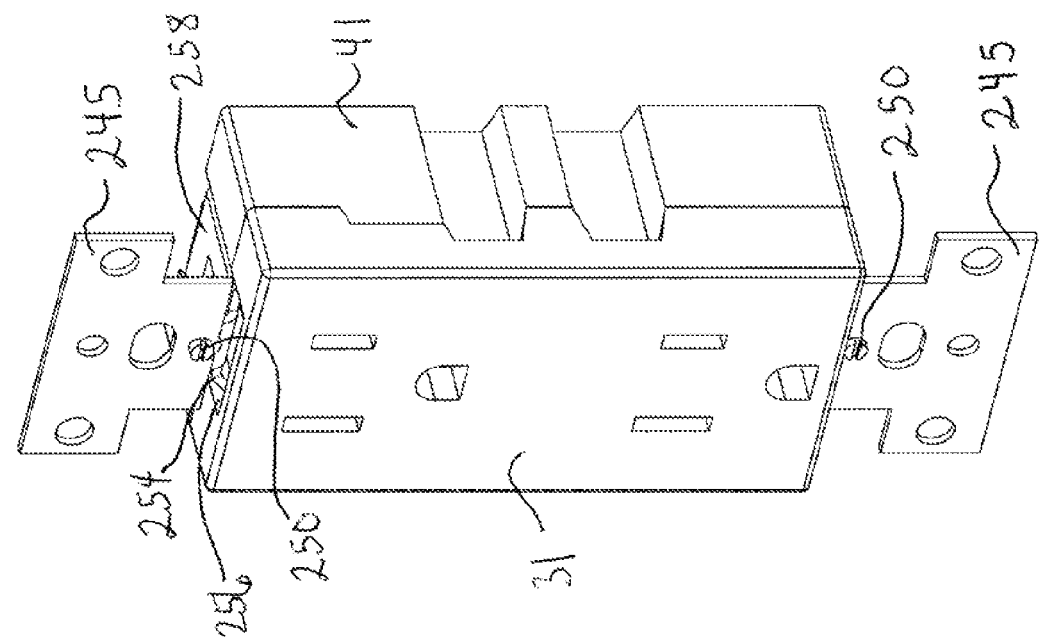

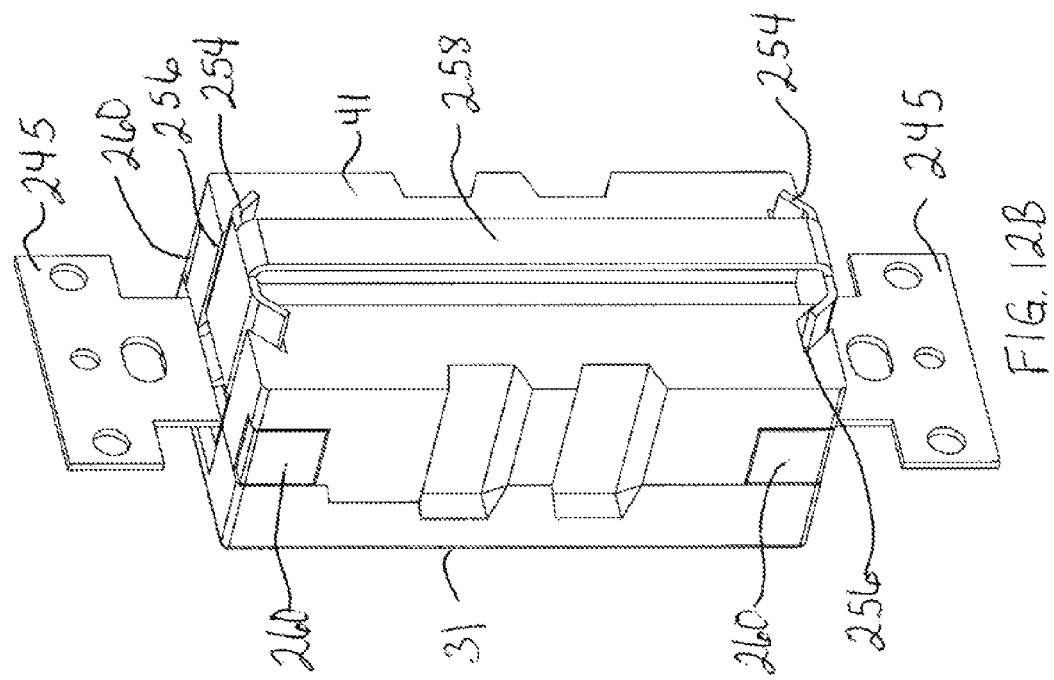
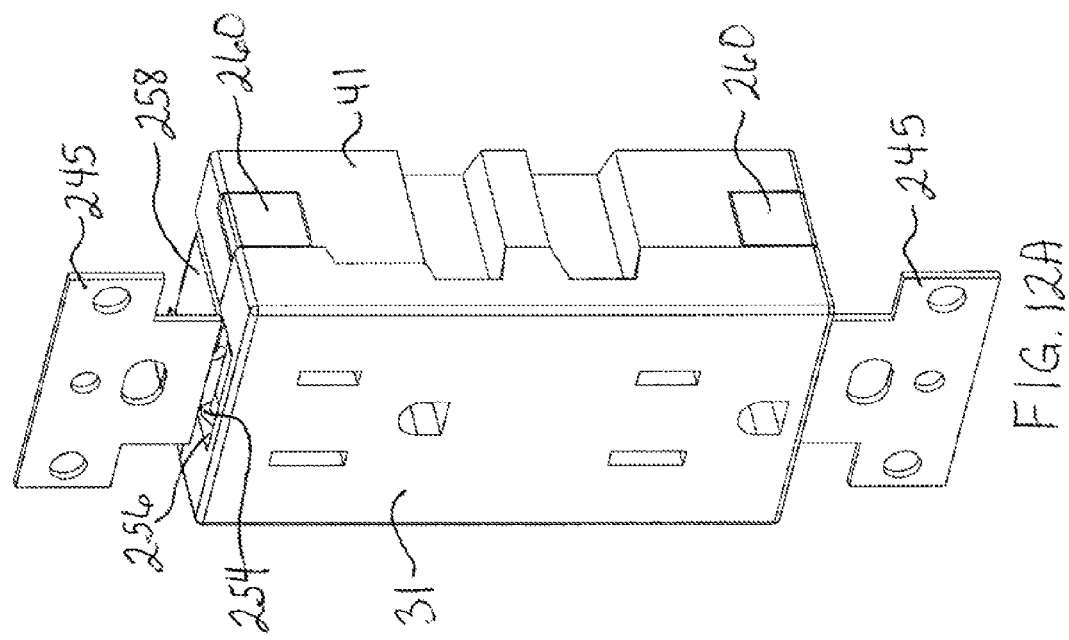

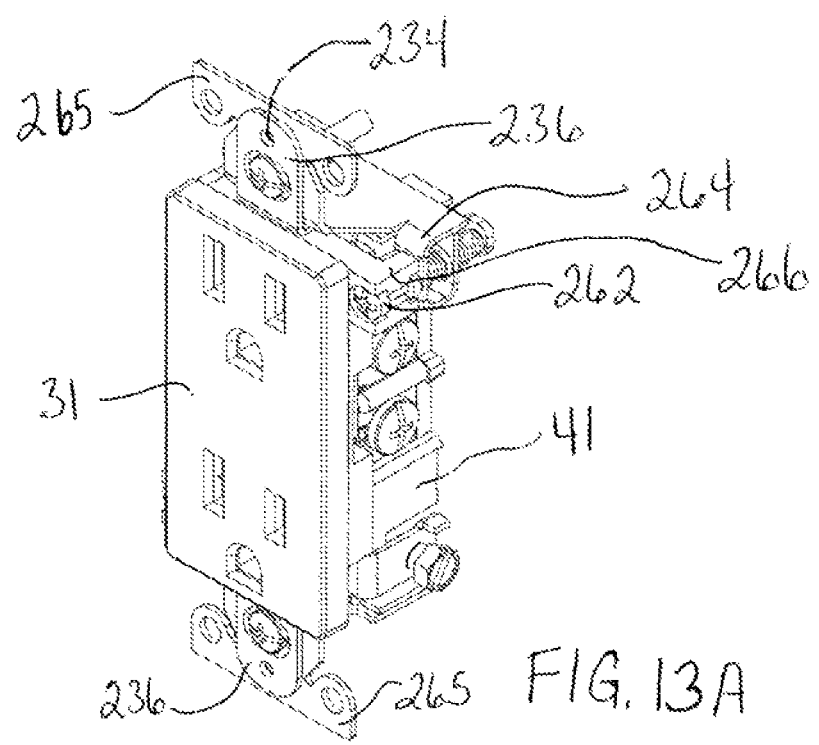

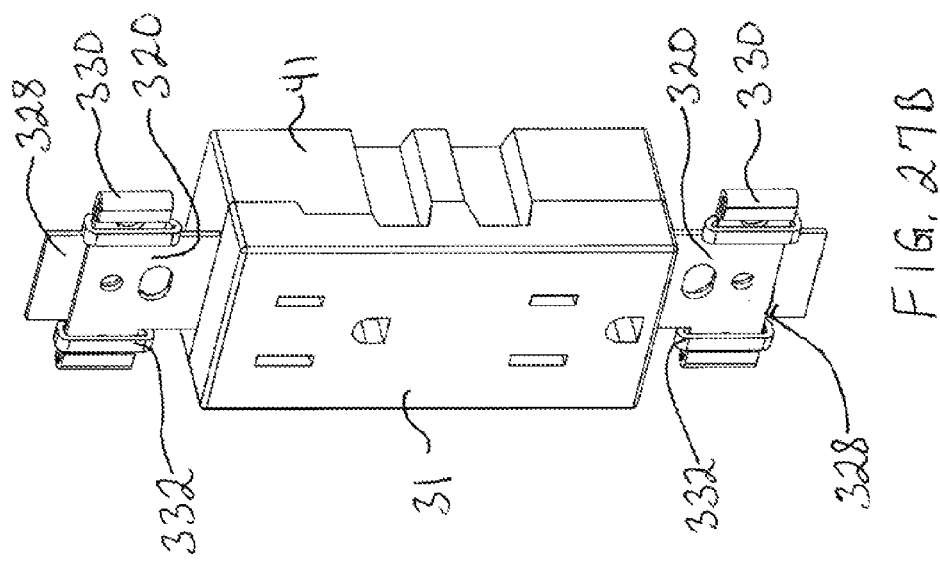
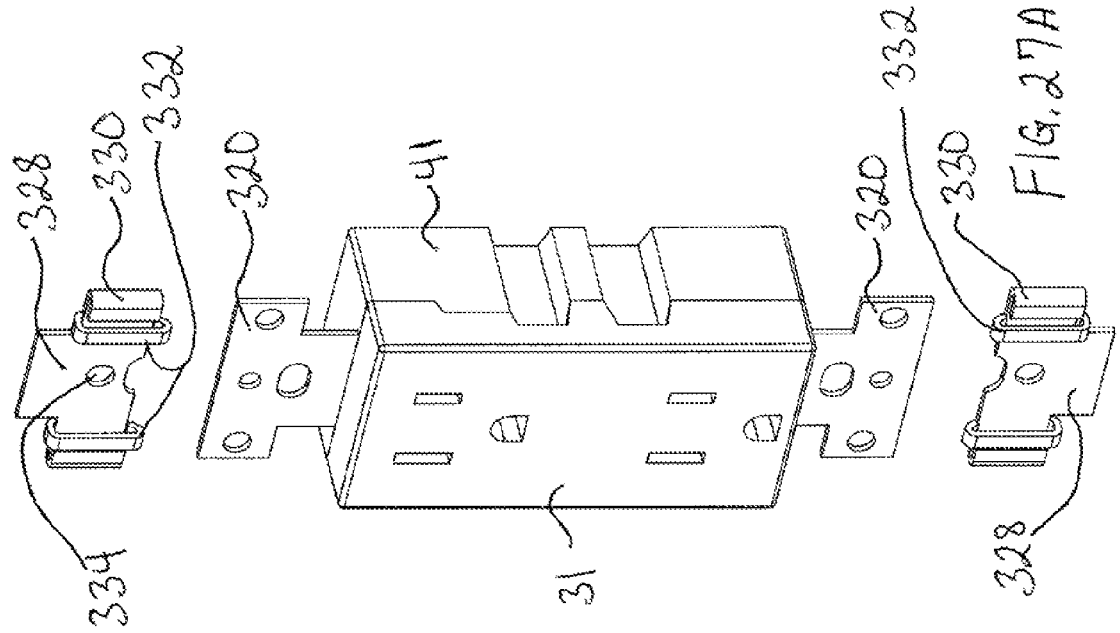

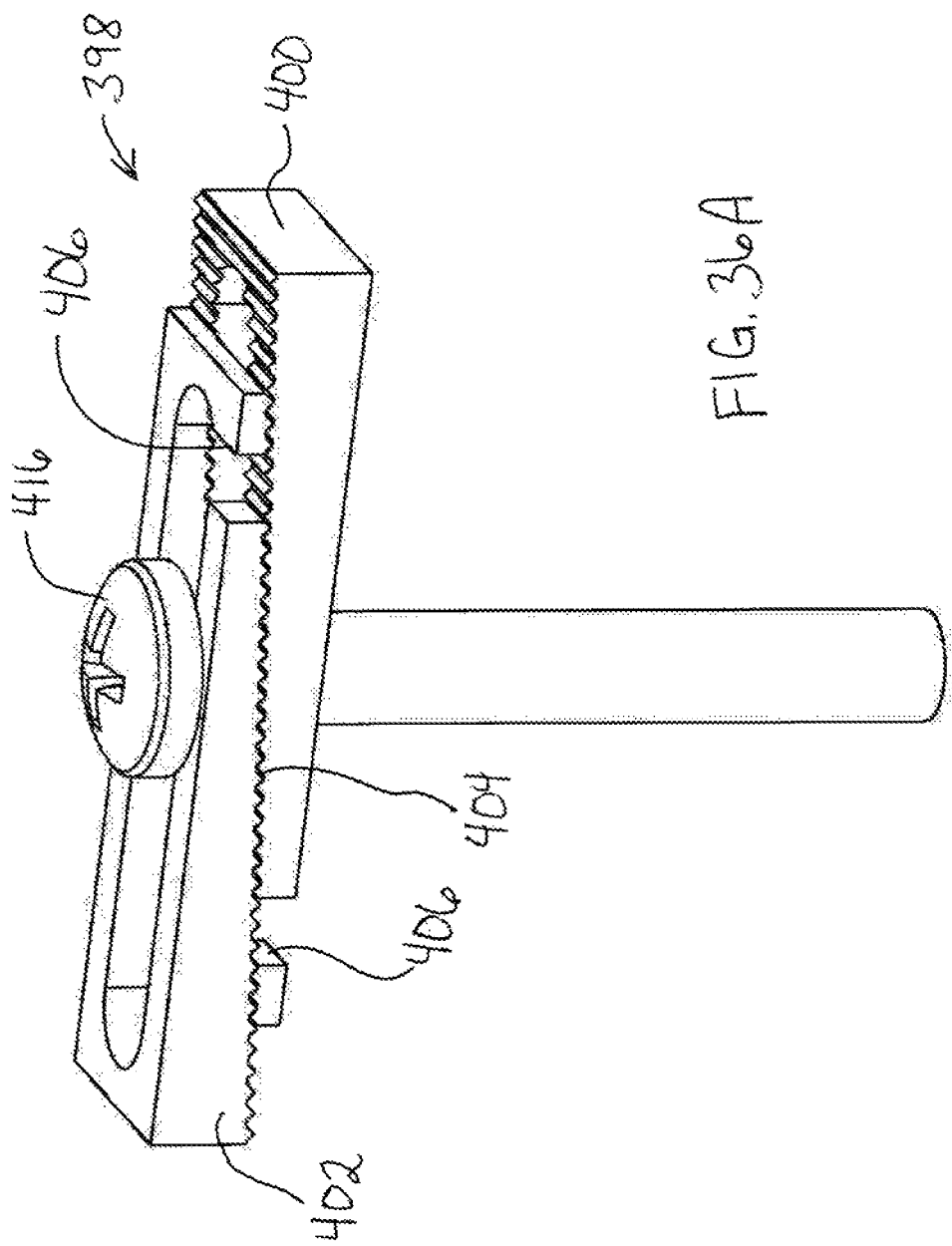

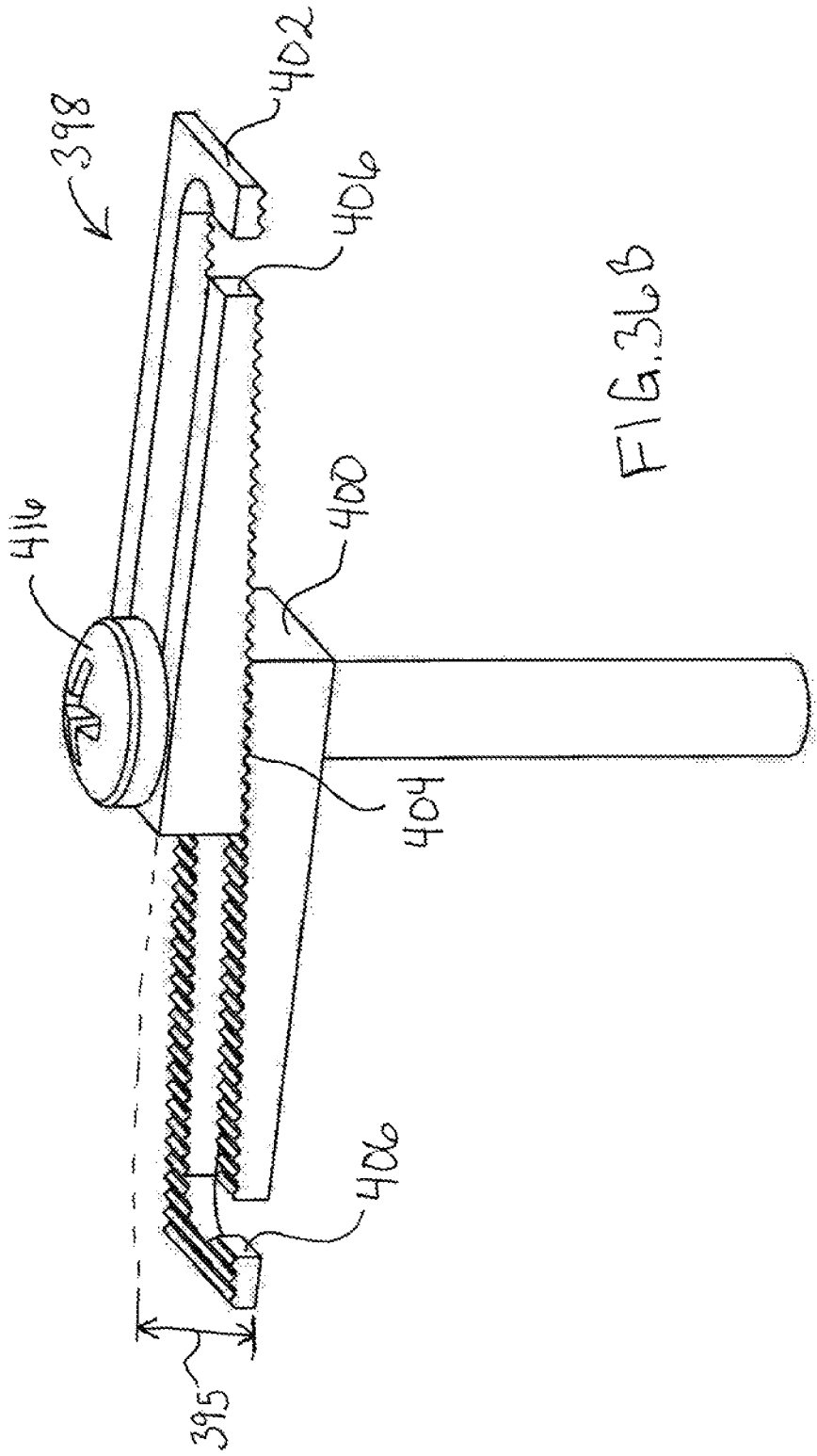

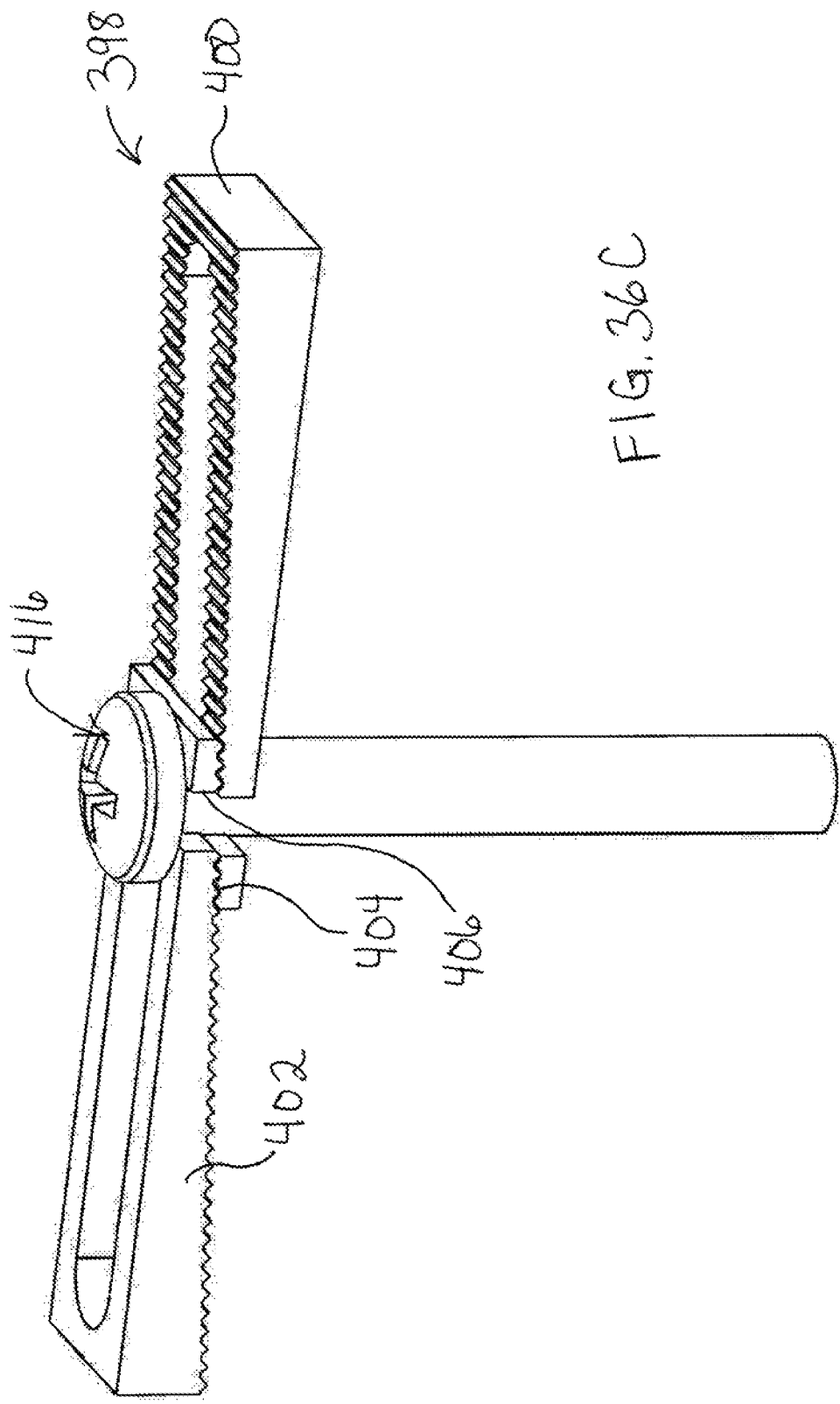

SYSTEM FOR ADJUSTABLY MOUNTING AN ELECTRICAL DEVICE

CROSS REFERENCE TO RELATED APPLICATIONS

This document is a continuation-in-part application of currently pending U.S. patent application Ser. No. 12/577,648 entitled "System of Adjustably Mounting an Electrical Device," filed Oct. 12, 2009, the disclosure of which is hereby incorporated herein by reference. This document also claims the benefit under 35 U.S.C. §119(e) of the following applications: U.S. Provisional Application Ser. No. 61/252,840, filed Oct. 19, 2009, entitled "Adjustable Receptacle Spring Yoke"; U.S. Provisional Application Ser. No. 61/245,371, filed Sep. 24, 2009, entitled "Adjustable Receptacles"; U.S. Provisional Application Ser. No. 61/252,853, filed Oct. 19, 2009, entitled "Adjustable Receptacle Insert"; U.S. Provisional Application Ser. No. 61/265,412, filed Dec. 1, 2009, entitled "Removed Corners Electrical Device"; U.S. Provisional Application Ser. No. 61/316,271, filed Mar. 22, 2010, entitled "Adjustable Electrical Devices"; the disclosures of all of which are hereby incorporated herein by reference.

BACKGROUND

1. Technical Field

Aspects of the present disclosure relate to mounting structures that allow for the adjustment of the installed position of electrical devices.

2. Background Art

This disclosure relates to electrical devices and boxes. Often times an electrical box is installed too far backward into the wall or crooked, not in compliance with the National Electrical Code which requires that boxes be installed such that the front face of the open end of the electrical box is flush or coplanar with the front face of the wall. Proper installation results in the yoke of an electrical device being coplanar with the front rim of the electrical box and flush with the face of the wall when the device is installed. Improper installation results in the yoke of the electrical device not being supported by the electrical box or not being flush with the face of the wall. When a faceplate, such as a wall plate or switch plate, is installed on the electrical device, the faceplate essentially becomes the sixth side of the electrical box. When the device is properly installed, the face of the electrical device extends through an opening in the faceplate so that there are no sizeable gaps between the electrical device and the faceplate that could expose the public to the electrical wiring within the box. Properly installed devices ideally also are correctly aligned vertically so that the cover plate is vertically aligned with the wall.

SUMMARY

The present disclosure describes, among other things, various applications of mounting structures that allow for the installed depth or other position of electrical devices to be adjusted.

In one aspect, an adjustably mountable electrical device may comprise an electrical device comprising an electrical device housing, an electrical device face on a front side thereof, and a yoke adjustably mounted at each of two opposing sides of the electrical device housing, the yokes each having a front side and a back side and an electrical box mounting screw aperture positioned to align with electrical box mounting screw bosses of an electrical box extending through the yoke, a horizontal distance between the electrical device face and the electrical box mounting screw aperture of each yoke defining an electrical device mounting depth for that yoke, wherein the yokes are adjustably mounted such that the electrical device mounting depths for the yokes are adjustable to increase or decrease the horizontal distance between the electrical device face and the electrical box mounting screw aperture of the yokes.

Particular implementations may comprise one or more of the following features. The electrical device may be one of an electrical receptacle, a switch, a dimmer and a ground fault circuit interrupt (GFCI) receptacle. At least one electrical device mounting depth may be adjustable by moving at least one of the yokes closer to or farther away from the electrical device face. The at least one electrical device mounting depth may be adjustable by adjusting a screw threadedly coupled to at least two first brackets, one each coupled to one of each of the two yokes, the at least two first brackets each slidably coupled to one of at least two second brackets coupled to a strap of the electrical device, the strap extending from a first of the two opposing sides to a second of the two opposing sides. The electrical device may further comprise a strap extending through the electrical device housing and being electrically coupled to a ground terminal of the electrical device, the strap being adjustably coupled to the yokes and fixed in its spatial relationship to the electrical device face. The at least one electrical device mounting depth may be adjustable by adjusting a position of at least one yoke in relation to the strap. At least one yoke may be slidably mounted to the electrical device housing through a channel and wherein the at least one electrical device mounting depth is adjustable by adjusting the yoke in the channel closer to or farther away from the electrical device face. The electrical device may further comprise a strap extending through the electrical device housing and being electrically coupled to a ground terminal of the electrical device, the strap being fixedly coupled to or integral with the yokes and adjustably coupled to the electrical device housing such that at least a portion of the strap is moveable in relation to the device face to adjust the electrical device mounting depth. The yokes may be fixedly coupled to the electrical device housing and the electrical device face is adjustably coupled to the electrical device housing such that at least a portion of the electrical device face is adjustable closer to or farther away from the yokes to adjust the electrical device mounting depth. The electrical device may further comprise a strap extending through the electrical device housing and being electrically coupled to a ground terminal of the electrical device, the strap being fixedly coupled to or integral with the yokes. The electrical device may further comprise at least one release button on a side of the electrical device housing, electrical device face slidably coupled with the electrical device housing, the release button operatively associated with the electrical device face and electrical device housing to engage the electrical device face with the electrical device housing to permit and stop sliding movement of the electrical device face in relation to the electrical device housing. The yokes may be adjustably mounted such that the electrical device mounting depths for the yokes are adjustable to increase or decrease the horizontal distance between the electrical device face and a portion of the electrical box mounting screw apertures of the yokes on the back side of the yokes.

According to another aspect, an adjustably mountable electrical device may comprise an electrical device housing, an electrical device face on a front side thereof, and a yoke mounted at each of two opposing sides of the electrical device housing, the yokes each being electrically coupled to an adjustable, electrically conductive strap of the electrical device, wherein the adjustable, electrically conductive strap is adjustably mounted such that a horizontal distance between the electrical device face and the electrically conductive strap is adjustable to increase or decrease the horizontal distance between the electrical device face and the electrically conductive strap.

Particular implementations may comprise one or more of the following features. The adjustable, electrically conductive strap may be in a fixed spatial relation with the yokes. The adjustable, electrically conductive strap may extend through the electrical device housing and may be electrically coupled to a ground terminal of the electrical device. The adjustable, electrically conductive strap may extend around a back surface of the electrical device housing. The electrical device may further comprise at least one screw threadedly coupled with the strap and rotationally coupled in a fixed linear position with the electrical device such that rotation of the at least one screw causes the strap to move horizontally forward or backward in relation to the front face. The at least one screw may comprise at least two screws. The front face may be slidably coupled with the electrical device housing, wherein the adjustable, electrically conductive strap is adjustable by sliding the front face horizontally forward or backward in relation to the electrically conductive strap.

According to another aspect, a method of adjusting a mounting depth of an electrical device may comprise mounting an electrical device comprising a face and at least one yoke in an electrical box by coupling the electrical device to the electrical box using electrical box mounting screws extending through at least one aperture in the at least one yoke, a horizontal distance between the face and at least a portion of the at least one yoke defining an electrical device mounting depth for the at least one yoke and increasing or decreasing the electrical device mounting depth for the at least one yoke. In particular implementations, increasing or decreasing the electrical device mounting depth for the at least one yoke may comprise increasing or decreasing the electrical device mounting depth for the at least one yoke after the electrical device is coupled to the electrical box.

The foregoing and other aspects, features, and advantages will be apparent to those artisans of ordinary skill in the art from the DESCRIPTION and DRAWINGS, and from the CLAIMS.

Unless specifically noted, it is intended that the words and phrases in the specification and the claims be given their plain, ordinary, and accustomed meaning to those of ordinary skill in the applicable arts. The inventor is fully aware that he may be his own lexicographer if desired. The inventor expressly elects, as his own lexicographer, to use only the plain and ordinary meaning of terms in the specification and claims unless it is clearly stated otherwise and then further, expressly set forth the "special" definition of that term and explain how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. §112, ¶6. Thus, the use of the words "function," "means" or "step" in the Description or claims is not intended to somehow indicate a desire to invoke the special provisions of 35 U.S.C. §112, ¶6, to define the disclosure. To the contrary, if the provisions of 35 U.S.C. §112, ¶6 are sought to be invoked to define the applications disclosed herein, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of 35 U.S.C. §112, ¶6. Moreover, even if the provisions of 35 U.S.C. §112, ¶6 are invoked to define the claimed applications disclosed herein, it is intended that the disclosure not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

BRIEF DESCRIPTION OF THE DRAWINGS

A more complete understanding of the present disclosure may be derived by referring to the detailed description when considered in connection with the following illustrative figures. In the figures, like reference numbers refer to like elements or acts throughout the figures.

FIGS. 6A-6C depict, respectively, front, side and cross-sectional views of a particular adjustment structure with an angled set screw;

FIG. 7 depicts a perspective view of a particular implementation of an adjustable mounting structure with a side-positioned adjustment;

FIGS. 8A-8C depict, respectively, side views of the particular implementation of FIG. 7 at three different adjusted depths;

FIGS. 10A & 10B depict the assembled particular implementation of FIGS. 9A and 9B in, respectively, recessed and extended positions;

FIGS. 11C & 11D depict, respectively, front and rear perspective views of the particular implementation of the adjustable mounting structure of FIGS. 11A and 11B in a second adjusted position;

FIGS. 12A & 12B depict, respectively, front and rear perspective views of a particular implementation of an adjustable mounting structure maintained in place by friction;

FIG. 13A depicts a perspective view of a particular implementation of an electrical device comprising adjustable mounting structure with an alternative adjusting screw;

FIGS. 27A & 27B depict, respectively, first and second spacer positions of a second embodiment of an adjustable yoke spacer;

FIGS. 36A-36C depict multiple views of a second particular embodiment of an adjustable spacer for a box mounting screw of an electrical device.

Elements and acts in the figures are illustrated for simplicity and have not necessarily been rendered according to any particular sequence, implementation or embodiment.

DESCRIPTION

In the following description, and for the purposes of explanation, numerous specific details are set forth in order to provide a thorough understanding of the various aspects of the disclosure. It will be understood, however, by those skilled in the relevant arts, that the present applications may be practiced without these specific details. In other instances, known structures and devices are shown or discussed more generally in order to avoid obscuring the applications. In many cases, a description of the operation is sufficient to enable one to implement the various implementations and embodiments. It should be noted that there are many different and alternative configurations, devices and technologies to which the disclosed applications may be applied. The full scope of the disclosure is not limited to the examples that are described below.

Although the particular implementations and embodiments shown in the Figures specifically illustrate rectangular electrical receptacles, this disclosure is applicable to all electrical devices that mount in electrical boxes in a wall, including but not limited to electrical receptacles, switches, dimmers and other devices. It is also intended that any of the electrical devices referred to in this disclosure be may be suitable for use with 110V, 220V, or any other applicable voltage, and for use with electrical devices of any shape and size of the type that is conventionally installed into a single, double, triple, four or more gang electrical outlet box.

Figure 1A:
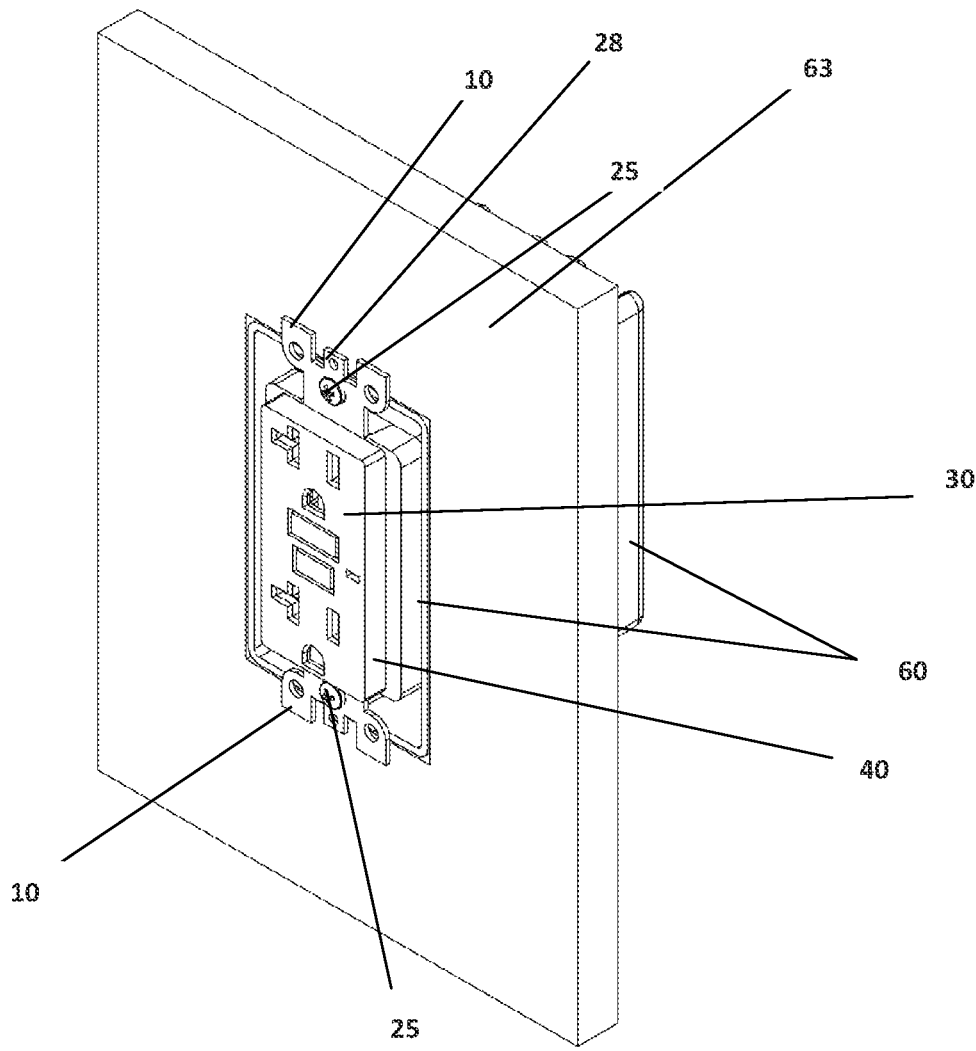
FIG. 1A depicts a proper installation of an electrical device.
Figure 1B:
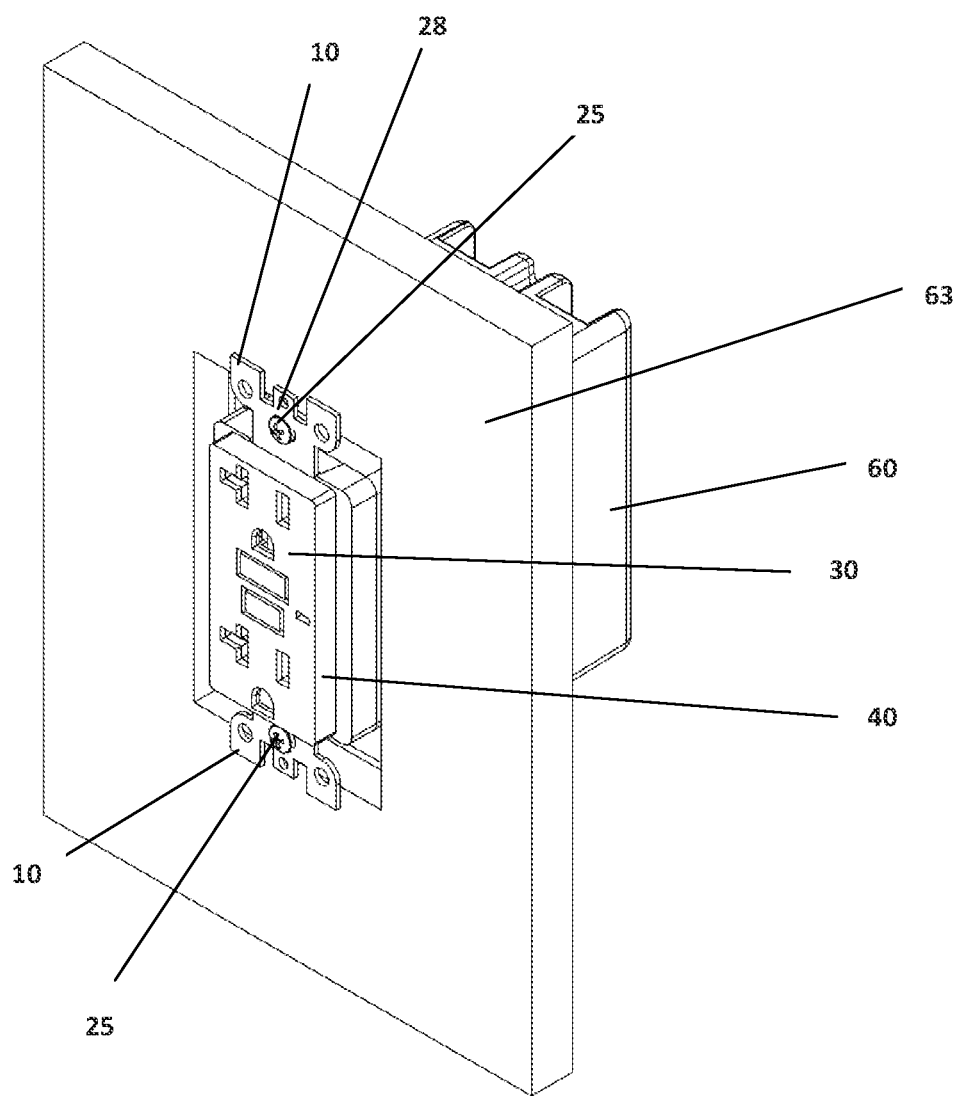
FIG. 1B depicts an improper installation.

FIG. 1A depicts a proper installation wherein an electrical box 50 is installed such that its front face is flush with the wall face 63 and an electrical device 40 is properly installed so that the cover plate of the electrical device will be flush with the wall face 63. By contrast, FIG. 1B shows a very common installation where the electrical box 50 is placed too far into the wall so that the front face of the electrical box is recessed below the wall face 63. This improper installation will result in the electrical box 60 not being in direct support of the yoke 10 of the electrical device 40 or the electrical device 40 being installed back into the wall 63 such that the faceplate leaves a gap between the faceplate and the face 30 of the electrical device 40. Among other problems resulting from this improper installation is that the yoke 10 of the electrical device 40 may bend as the box mounting screws 25 are tightened which may cause the face 30 of the electrical device 40 to move backward into the electrical box 60, thereby negatively affecting the aesthetics and safety of the final installation as the electrical device 40 by leaving a gap between the front face 30 of the electrical device 40 and the faceplate. Additionally, in cases where the yoke 10 is recessed back behind the wall face 63, the plate mounting screw aperture 28 also recesses behind the wall face 63. Plate mounting screws are conventionally very short screws and are used in situations, like that shown in FIGS. 1A and 1B, where a ground fault current interrupt outlet (GFCI) or switch is used because it does not have a center mount screw aperture on the electrical device. As a result, if the yoke 10 is recessed behind the wall face 63 the plate mounting screw often cannot reach the threaded plate mounting screw hole unless the installation is done correctly or a longer replacement screw is used. Another possible problem is that the electrical device may not be solidly held in place, again causing safety issues.

Additionally, if the hole cut in the wall is too large, one or the other of the yoke 10 of the electrical device 40 may be allowed to move backward until it meets the front face of the electrical box 60, thereby also creating a negative aesthetic and safety effects. In this instance, a great deal of time and effort may be expended in removing the electrical box 60 that has been installed in an oversized hole in the wall, positioning and installing a new electrical box 60, and reinstalling the electrical device 40. Accordingly, it is desirable to simply adjust the electrical device 40 so that it is solidly supported by the box and yet will be coincident with the front of the wall face 63 so that there is no visible gap between the electrical device 40 and the face plate. It should be noted that the portions of the yoke 10 depicted in the figures are merely those portions of the yoke 10 that extend from the electrical device 40. The upper and lower yoke portions 10 are actually electrically coupled together by a strap 12. A conventional electrical device configured for mounting in an electrical box comprises electrical device housing including an electrical device face, electrical device connections within the housing (depending upon what type of electrical device it is, the electrical device connections and wiring is different, but is known to those of ordinary skill in the art), and an electrically conductive strap that extends through the electrical device and typically includes yokes at each end that extend at the top and bottom of the electrical device for coupling the electrical device to mounting box screw holes in an electrical mounting box and sometimes to an electrical cover plate. The strap is electrically coupled to the grounding wire of the electrical device for safety purposes. Yokes come in many different shapes and sizes and use of the term "yoke" is not intended to imply any particular shape or size. In general, a yoke of an electrical device of the type discussed in this document for installation in a standard electrical box such as an electrical outlet box that comes in single gang and dual gang sizes, need only have an electrical box mounting screw aperture extending through it for mounting the electrical device to an electrical box.

Figure 21:
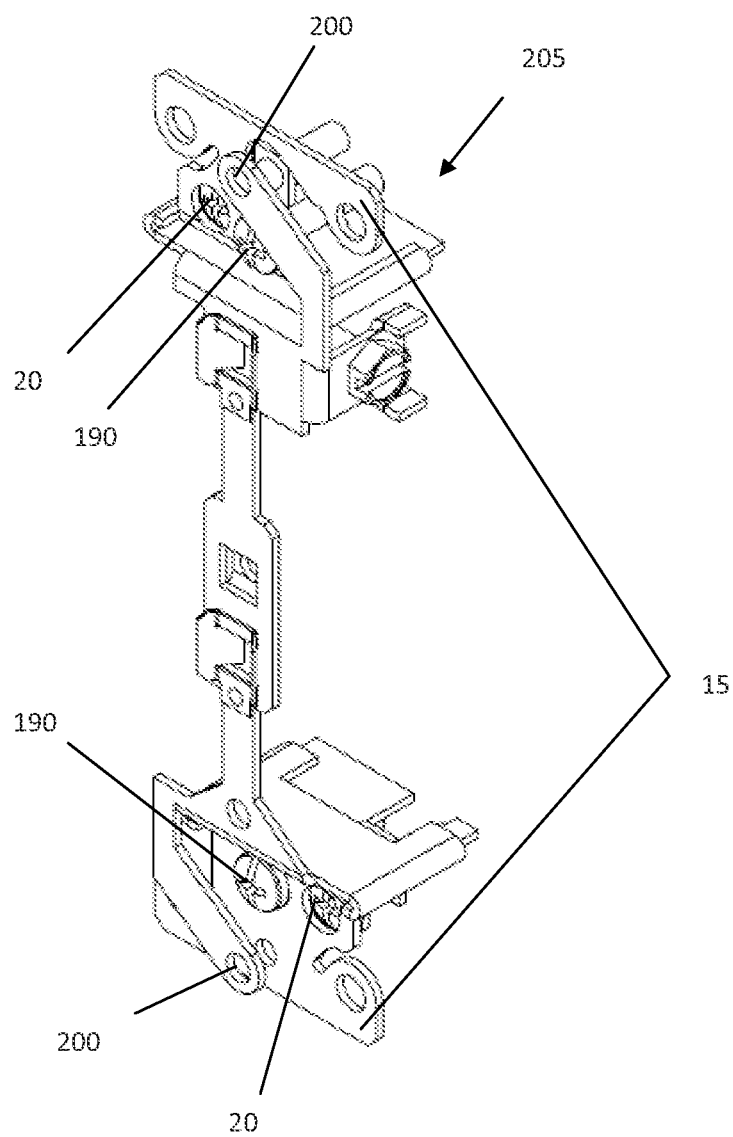
FIG. 21 depicts a perspective view of a yoke for a particular implementation of an adjustable mounting electrical device.
Figure 22:
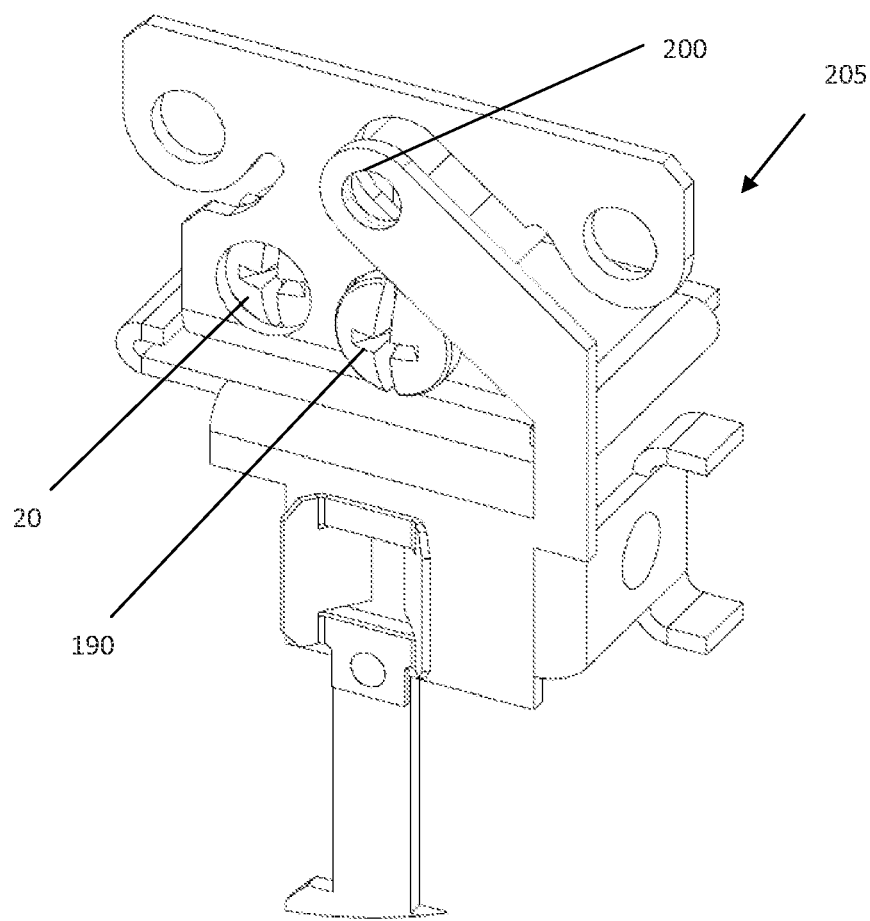
FIG. 22 depicts a close-up view of the yoke of FIG. 21.

FIGS. 30-33 illustrate an example of a conventional yoke 10 with a strap 12 but with particular implementations of adjustable yoke springs attached thereto. The strap 12 of a conventional yoke 10 is continuous with the yoke 10 and provides electrical conductivity from the yoke ends through the center of the strap which extends through the housing of the electrical device between the device face and the housing shell that holds the electronics of the electrical device. The particular yoke implementation of FIGS. 21 and 22 illustrate the complete yoke for an adjustable electrical device with the other electrical device portions removed for convenience of illustration.

Figure 2:
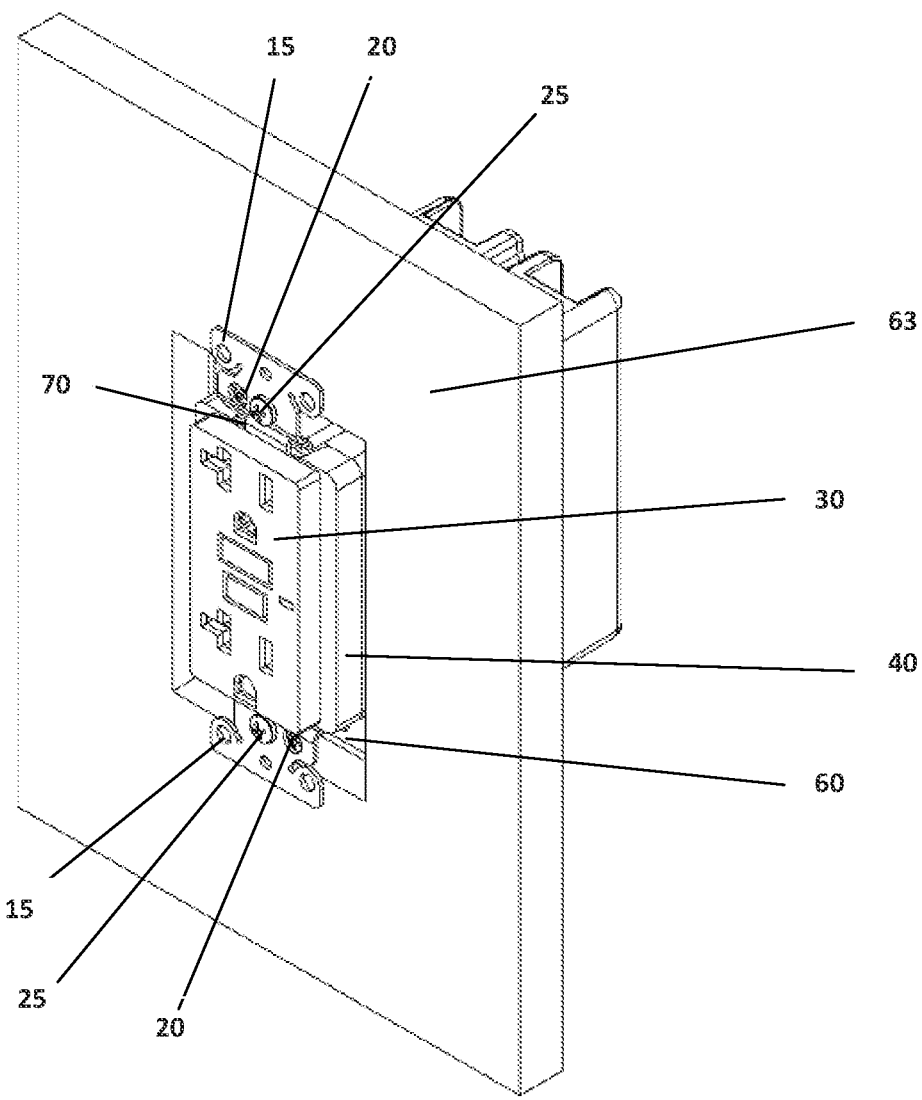
FIG. 2 depicts an installed electrical device having an adjustable mounting structure.
Figure 3:
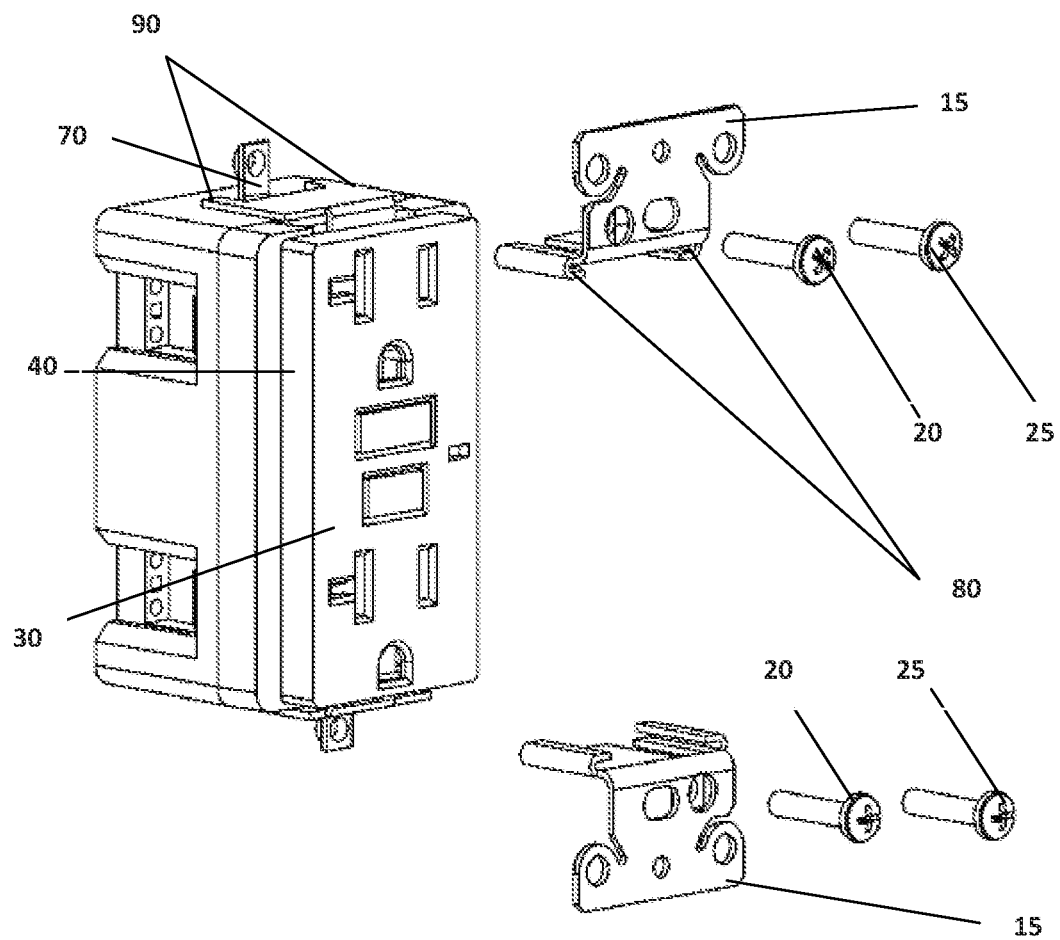
FIG. 3 depicts an exploded view of an electrical device with a first implementation of an adjustable mounting structure.
Figure 5:
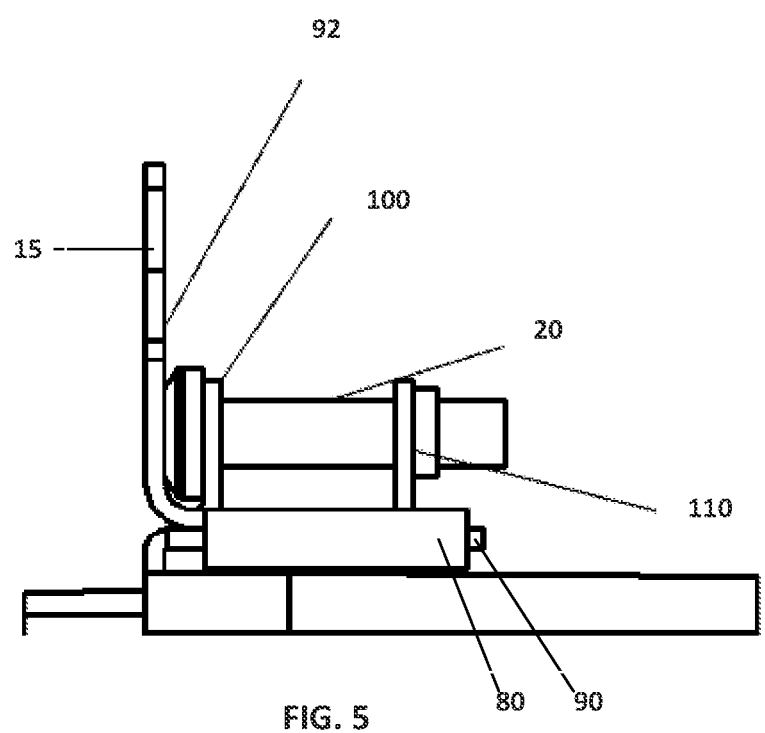
FIG. 5 depicts a close-up view of an adjustment structure of a particular implementation.
Figure 9A:
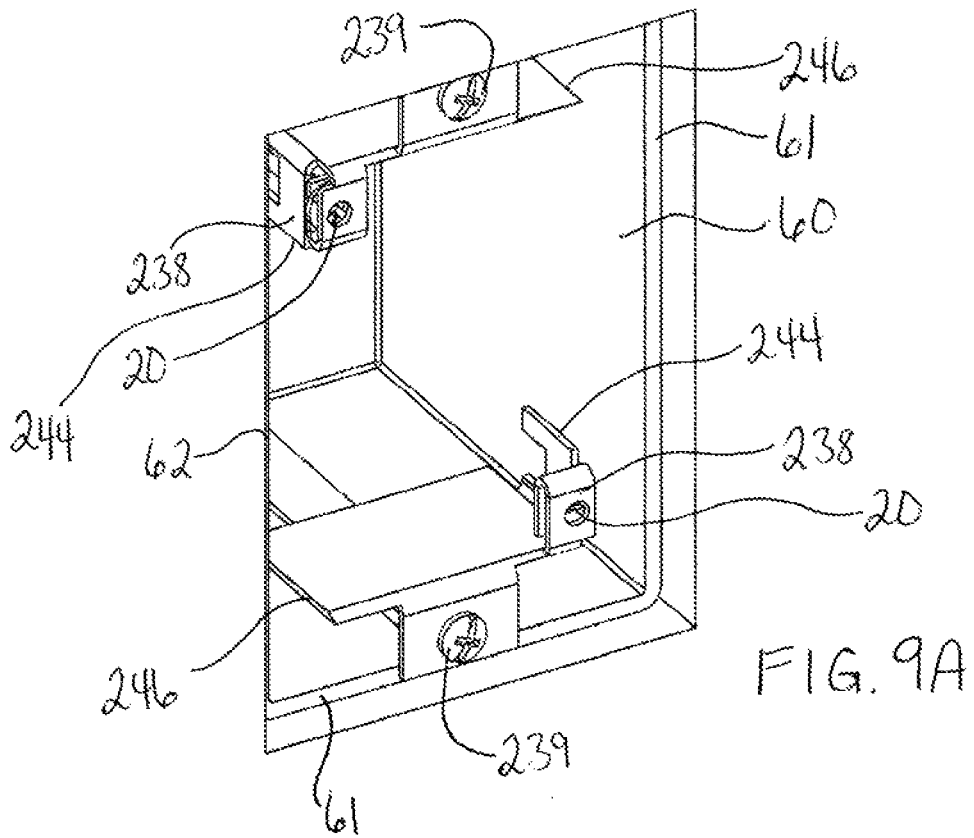
FIG. 9A depicts an electrical box with a first portion of a particular implementation of an adjustable mounting structure mounted therein.
Figure 9B:
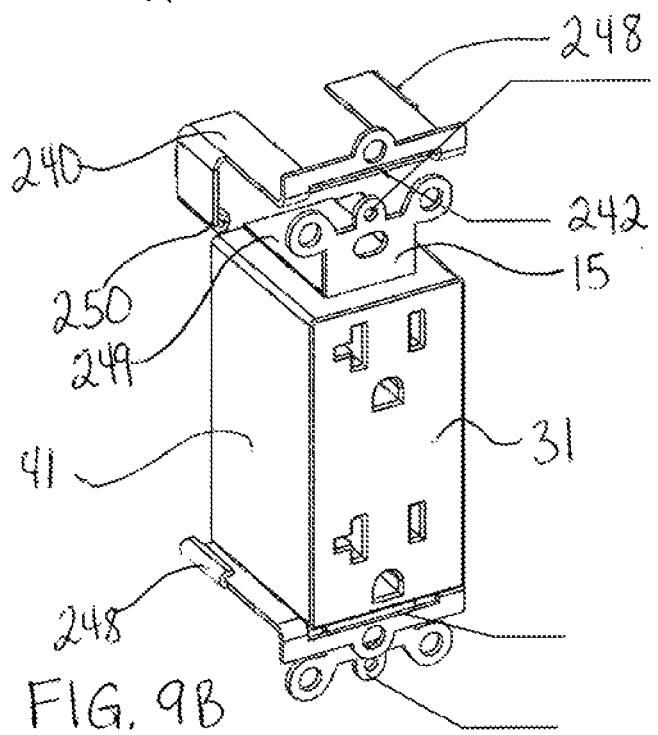
FIG. 9B depicts an electrical device comprising a second portion of the particular implementation of the adjustable mounting structure of FIG. 9A.

FIG. 2 depicts an application of a particular implementation of an adjustable mounting electrical device installed in place of the current state-of-the-art device shown in FIGS. 1A, 1B and 1C in an installation having the electrical box 50 set far back in the wall so that the front face of the electrical box is recessed behind the front face of the wall 60. The embodiment of FIG. 2 includes an adjustable yoke 15 portion with an adjustment screw 20 laterally offset from the box mounting screw 25 that engages a fixed strap 70 to allow the adjustable yoke 15 to move in relation to the strap 70. FIG. 3 shows an exploded view of the electrical device of FIG. 2 with the adjustable yoke 15 (adjustable in relation to the electrical device), strap 70, and an adjustment screw 20 to allow for adjustment of the mounting of the electrical device 40. The adjustable yoke 15 and strap 70 may also be interconnected by rails 90 and tracks 80 as shown in FIGS. 3 and 5. Although not limited to this arrangement, the mounting screw 20 may be trapped between the back face 92 of the adjustable yoke 15 and a rear bearing face 100 formed from the same yoke 15 portion. As a screwdriver is used to turn the adjustment screw 20, the head of the screw 20 remains in the gap between these two bearing surfaces 92, 100. The threaded boss 110 on the strap 70 then moves the strap 70 and the electrical device 40 forward or backward in relation to the adjustable yoke 15 as the adjustment screw 20 is rotated. A box mounting screw 25 (FIG. 3) is located along a center axis of each yoke 15, with the adjustment screw 20 located off-center to one side of the box mounting screw 25. The box mounting screw 20 is aligned with the box mounting screw apertures of a conventional electrical outlet box.

FIG. 5 depicts a close-up view of a basic adjustment structure for an electrical device yoke. As the adjustment screw(s) 20 are turned, the electrical device 40 (FIG. 4) moves forward and backward in kind. While two adjustment screws 20 may be used in this and other particular implementations with an adjustment screw, any other number of adjustment screws 20, including only one adjustment screw in particular implementations, may also be used in various other configurations. For electrical boxes 50 (FIG. 1) that are installed at an angle relative to the wall, having two adjustment screws 20 may allow for the electrical device 40 to be adjusted to a greater extent on either the top or bottom as desirable from the angle of installation.

In any of the implementations using an adjustment screw, it may be more desirable to use only one adjustment screw. The adjustable yoke and strap may need to be fastened or tied together on one side of the electrical device 40. This would allow the adjustable yoke to move relative to the strap and the electrical device 40. To comply with the current National Electrical Code, the yokes and box mounting screws 25 must all be electrically coupled to ground and the center mounting screw 26 must thread into the strap 70 to ensure that metallic faceplates are also electrically coupled to ground. To comply with the current National Electrical Code, one of the adjustable yokes may also have a ground screw threaded into it so that an equipment grounding conductor or a grounding wire may be connected.

Figure 4A:
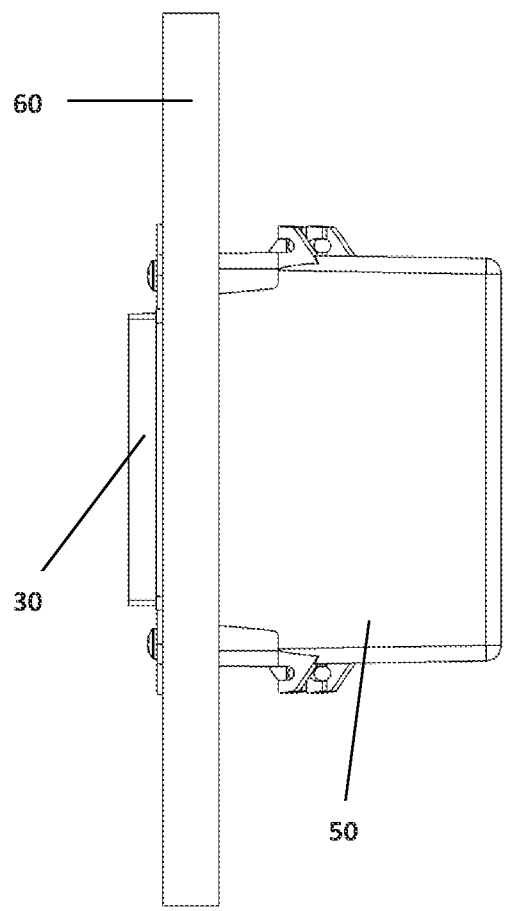
FIGS. 4A & 4B depict installations of an electrical device at different adjusted depths.
Figure 4B:
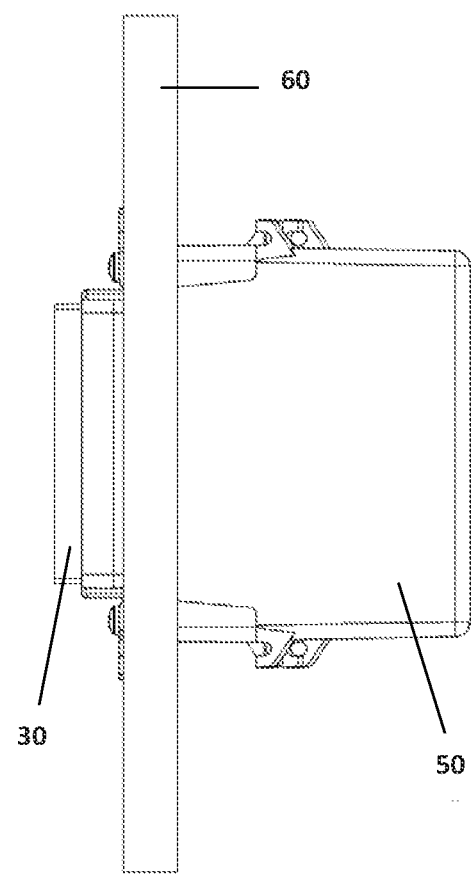
Figure 11B:
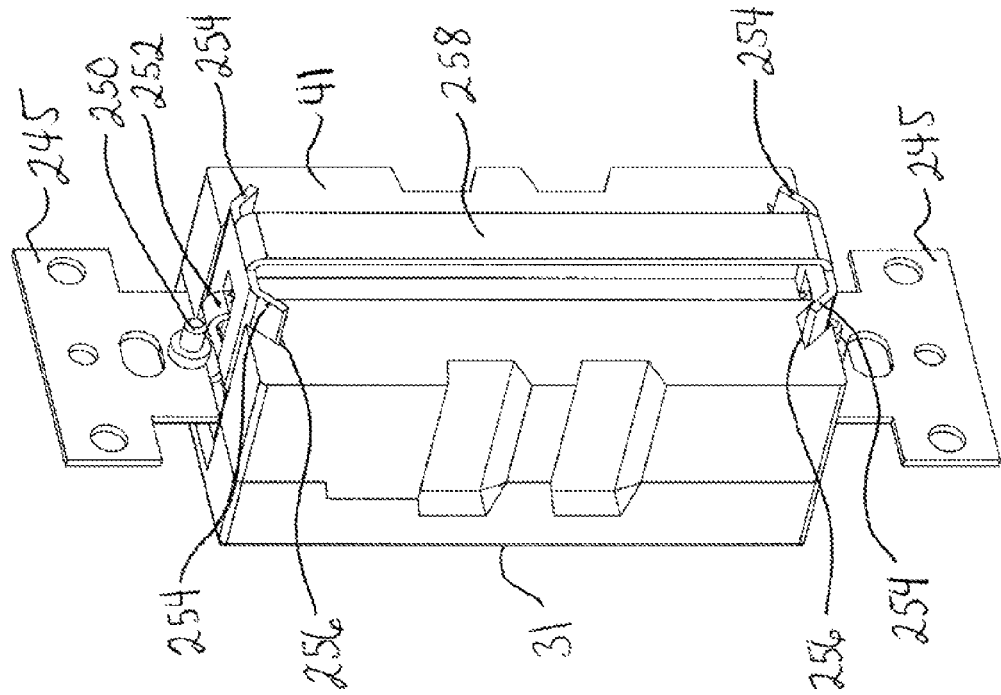
FIGS. 11A & 11B depict, respectively, front and rear perspective views of a particular implementation of an adjustable mounting structure using a set screw and claw in a first adjusted position.
Figure 11A:
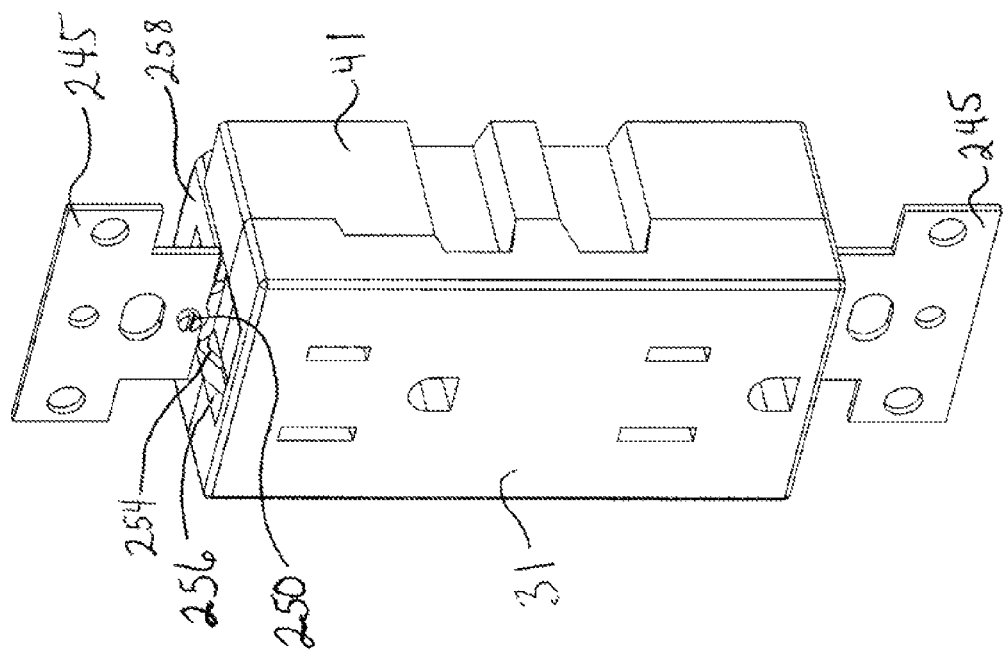
Figure 13B:
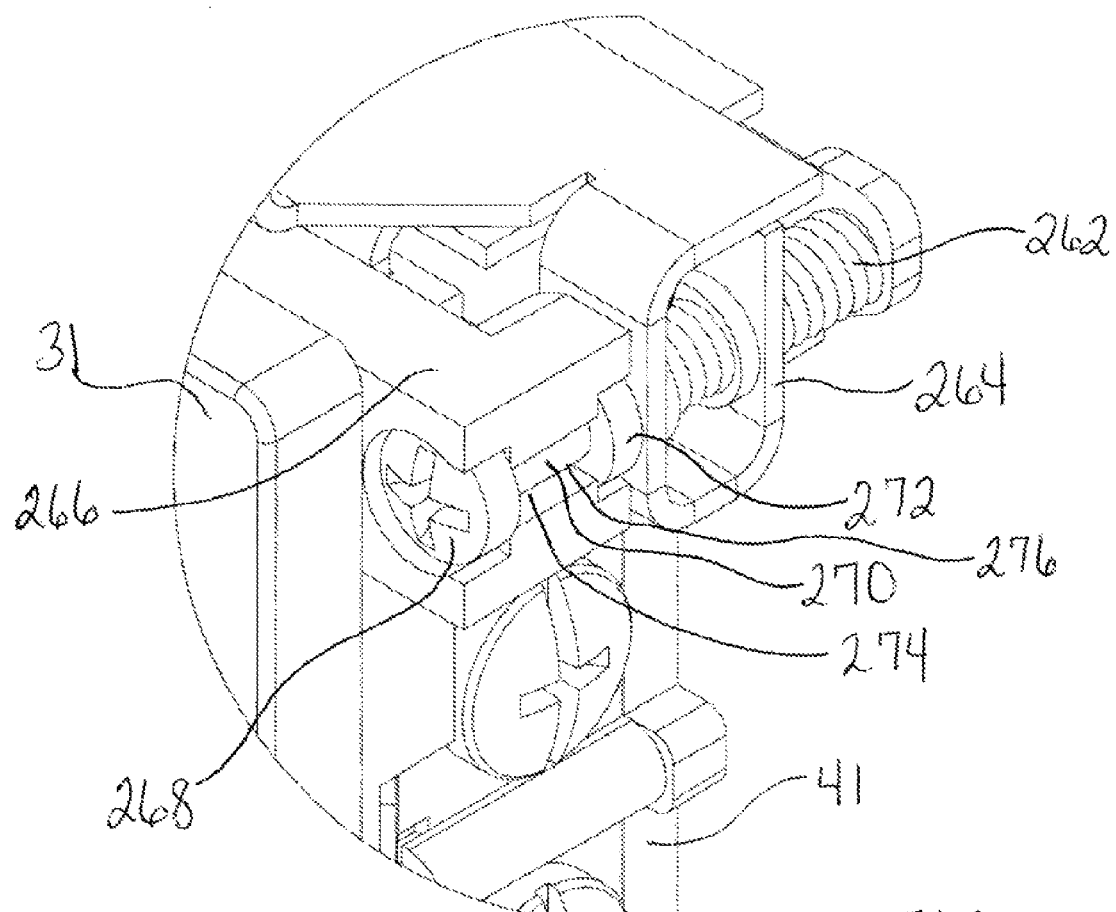
FIG. 13B depicts a close-up view of a portion of the adjustable mounting structure of FIG. 13A.
Figure 14:
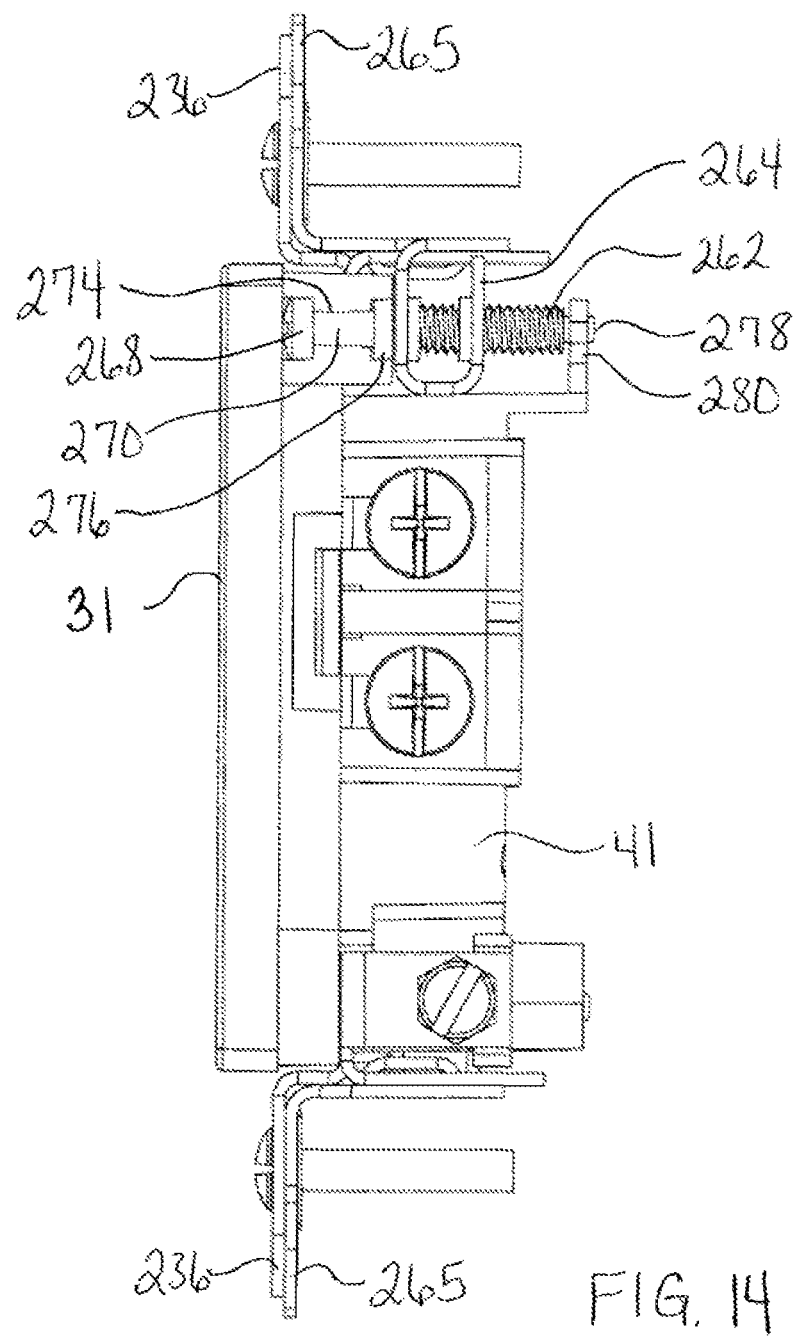
FIG. 14 depicts a side view of the particular implementation of FIG. 13A.
Figure 15:
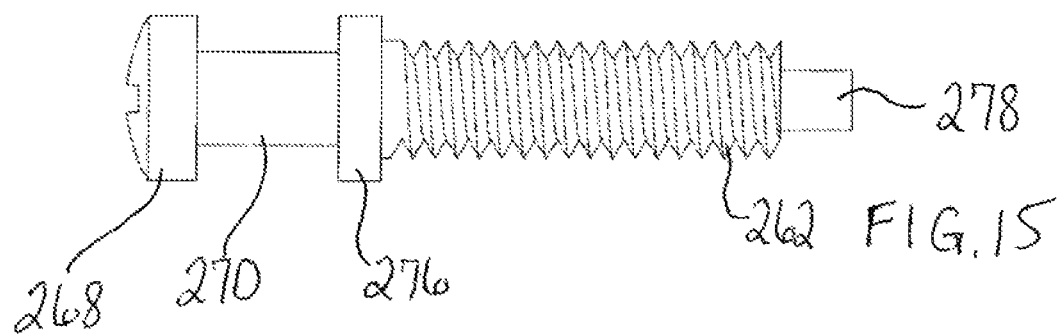
FIG. 15 depicts a close-up view of the alternative adjusting screw of FIG. 13A.

FIGS. 4A and 4B illustrate advantages of using an adjustable mount for an electrical device 40 wherein the electrical device 40 (FIG. 4) is, respectively, closer to and further away from the wall face 60. For the implementations similar to those of FIGS. 2, 3, 6, 7, 8, 9, 10, 13, 14, 16, 17, 18, 19, 21 and 22, this movement may be accomplished by adjustment of an adjustment screw. For implementations similar to those of FIGS. 11 and 12, this movement may be accomplished by frictional movement of an adjustable yoke. For implementations similar to those of FIGS. 20, 29, 30, 31, 32 and 33, this movement may be accomplished by adjustment of the box mounting screw directly. For implementations similar to those of FIGS. 24, 25, 27, 35, 36 and 37, this movement may be accomplished by adjustment of an integral or separate yoke spacer. The implementations of FIGS. 23, 25 and 26 adjust the vertical (up-and-down) positioning of the yoke's box mounting screw apertures in relation to the electrical device face rather than the horizontal (front-to-back) positioning. It is also contemplated that particular implementations may adjust the side-to-side positioning of the yoke's box mounting screw apertures using similar techniques. Those of ordinary skill in the art will understand the structures available to accomplish this upon review of the present disclosure.

A horizontal distance between the electrical device face and the electrical box mounting screw aperture of each yoke defines the electrical device mounting depth for that particular yoke. As illustrated in many of the particular implementations disclosed herein, in some implementations the two yokes of an electrical device may have different electrical device mounting depths because one of the yokes has been adjusted differently than the other. In particular implementations, adjustments may be made to the electrical device mounting depths to increase or decrease the horizontal distance between the electrical device face and the electrical box mounting screw aperture of the yoke.

FIGS. 6A-6C depict, respectively, front, side and cross-sectional views of a particular implementation of an adjustable yoke 220 that is frictionally engaged with a fixed yoke 222 of an electrical device 40 through rails 90 and tracks 80 like those illustrated in FIG. 3. An optional angled set screw 224 is included and coupled to the adjustable yoke 220 such that once the installer selects an appropriate position of the electrical device 40 in relation to the adjustable yoke 220 by moving the rails 90 within the tracks 80, the installer need only tighten the angled set screw 224 to cause it to engage an engagement surface 226 of the fixed yoke 222 and maintain the adjustable yoke 220 in place relative to the fixed yoke 222.

FIGS. 7 and 8A-8C illustrate another particular implementation of an adjustable mounting structure, with similarities to that of FIG. 3, but with one or two side-positioned adjustment screws 20. Similar to the particular implementation illustrated in FIG. 3, adjustment of the adjustment screws 20 result in relative movement between the adjustable yokes 215 and the electrical device face 30. The adjustable yokes 215 of this particular implementation each comprise a first bracket 232 extending to the side thereof, and a portion of the adjustment screw 20 is loosely trapped by the first bracket 232 so that the adjustment screw's position is generally positionally, but not rotationally, fixed in relation to the first bracket 232. A second bracket 230 extends from the electrical device 40 adjacent each of the adjustment screws 20 and comprises a threaded aperture therethrough. The adjustment screws 20 are threadedly coupled with the second brackets 230 such that rotation of the adjustment screws 20 results in relative movement between the first bracket 232 and the second bracket 230 and corresponding relative movement between the adjustable yokes 215 and the electrical device face 30.

Another difference from the particular implementation of FIG. 3 is that the particular implementation of FIG. 7 comprises an optional cover plate mounting screw aperture 234 through a cover plate support 236 above and below the electrical device face 30. The cover plate support 236 is fixed in its position relative to the electrical device face 30 which ensures that a cover plate mounted to the cover plate support 236 will always be spaced perfectly in relation to the electrical device face 30. As with other implementations, the adjustability of the adjustable yoke permits the device to have proper support on the wall and/or the electrical box despite the needed position of the cover plate screw apertures. For the particular implementation of FIG. 7, the cover plate support 236 is removable for adjustments of the adjustable yoke 215 farther forward than the cover plate supports 236 in relation to the electrical device face 30. FIGS. 8A-8C illustrate, respectively, recessed (8A), flush (8B) and forward (8C) positions of the adjustable yoke 215 in relation to the electrical device face 30. In FIG. 8C, the cover plate support 236 has been removed to permit the adjustable yoke 215 to be adjusted forward.

FIGS. 9A-10B illustrate another particular implementation of an adjustably mountable electrical device. For this implementation, the yoke 15 is fixed in its positional relationship with the electrical device face 31. Similar to the particular implementation of FIG. 7, this particular implementation comprises first brackets 238 that each loosely trap the head of an adjustment screw 20 such that rotational adjustment of the adjustment screw 20 causes linear movement of the respective second bracket 240. The yokes 15 of the electrical device 41 are each coupled one of the second brackets 240 so that the yokes 15 are supported by the second brackets 240 and move consistent with their respective movements. The particular implementation illustrated in FIGS. 9A-10B shows the yokes 15 being inserted into an opening 242 in the second brackets 238, but other coupling arrangements, such as through screws or clamps is also contemplated. The second brackets 238 are coupled to the electrical box 60 through the electrical box mounting screws 239 such that the second brackets 238 are fixedly mounted within the electrical box 60. The second brackets 238 each comprise rails 246 and 244 which couple with respective tracks 248 and 250 on the first brackets 240 to allow the first brackets 240, which are coupled to the electrical device 40, to slidably move in relation to the second brackets 238 when the adjustment screw 20 is turned. Thereby, the electrical device 40 maintains adequate support by the electrical box 60, but the relative positioning of the electrical device face 31 in relation to the front edge 61 of the electrical box 60 and the wall surface 62 may be adjusted. As illustrated best in FIG. 9B, the strap 249 of the electrical device 41 may be configured to extend around an outside surface of the electrical device 41 rather than through its center as is done in conventional electrical devices.

FIGS. 11A-11D illustrate another embodiment of adjustable yokes 245 for an electrical device 41 to permit individual adjustment of the adjustable yokes 245 in relation to the electrical device face 31. A set screw 250 of this particular implementation is mounted through the adjustable yoke 245 and may be tightened against a pressure grip 252 behind the adjustable yoke 245 to clamp the adjustable yoke 245 in place. Rails 254 frictionally engage and ride within tracks 256. The strap 258 of this particular implementation extends behind the electrical device 41 and is integral with the adjustable yoke 245 and in fixed positional relation to the adjustable yoke 245. In operation, an installer would mount the adjustable yoke 245 into an electrical box and then loosen the set screws 250 to allow the rails 254 to slide within the tracks 256. The installer then moves the electrical device 41 into the desired position in relation to the wall surface and secures both of the set screws 250 to lock the electrical device 41 into a fixed position in relation to the adjustable yokes 245. As illustrated best in FIGS. 11A and 11B, when the adjustable yokes 245 are shifted backward in relation to the electrical device 41, the strap 258 separates from the back side of the electrical device 41. As illustrated best in FIGS. 11C and 11D, when the adjustable yokes 245 are shifted forward in relation to the electrical device 41, the strap 258 moves closer to and eventually contacts the back side of the electrical device 41.

The particular implementation illustrated in FIGS. 12A and 12B are like the implementation of FIGS. 11A-11D, but without a set screw. Optional squeeze tabs 260 in a default position bias against a portion of the strap 258, such as against the rails 254, to maintain the adjustable yoke 245 in place relative to the electrical device 41. Squeezing opposing squeeze tab 260 sets on either the upper end or lower end of the electrical device 41 releases the bias against the portion of the strap 258 to release the rails 254 so that they can slidably move within the tracks 256 and permit the adjustable yoke 245 to be adjusted in its positional relationship to the electrical device face 31.

FIGS. 13A-15 illustrate another particular implementation of an adjustable yoke electrical device similar to the implementation of FIG. 7 with a side-positioned adjustment screws, but further comprising a particular adjustment screw 262 (FIG. 15) design. Like the implementation of FIG. 7, the particular implementation of FIGS. 13A-15 comprises fixed cover plate supports 236 with cover plate mounting screw apertures 234 and an adjustable yoke 265 which adjusts forward and backward in relation to the electrical device face 31 when the adjustable screw 262 is rotated. Different from the implementation of FIG. 7, however, the particular implementation of FIGS. 13A-15 comprises a different first bracket 264 coupled to the adjustable yoke 265 and a different second bracket 266 coupled to the electrical device 41. As best illustrated in the close-up view of a portion of the assembly shown in FIG. 13B, adjacent to the head 268 of the adjustment screw 262 is a shaft 270 and a shoulder 272 raised from the shaft 270 and providing a boundary between the shaft 270 and the screw head 268. The screw head 268 and the shoulder 272, in combination with the shaft 270 contain the movement of the screw relative to the second bracket 266. The opening 274 in the second bracket 266 is sized just smaller than the diameter of the shaft 270 such that the shaft 270 snaps through the opening into a shaft seat 276 in which it is permitted to rotate without changing its linear position with respect to the second bracket 266. The adjustment screw 262 is threadedly engaged with the first bracket 264 such that rotational movement of each adjustment screw 262 moves its respective first bracket 264, and its respective adjustable yokes 265 toward or away from the electrical device face 31 depending upon which direction the adjustment screw 262 is rotated. A centering pin 278 (FIG. 14) on an end of the adjustment screw 262 may be inserted into a third bracket 280 to keep the adjustment screw 262 from moving other than rotationally and to provide an end of movement for the first bracket 264.

Figure 16A:
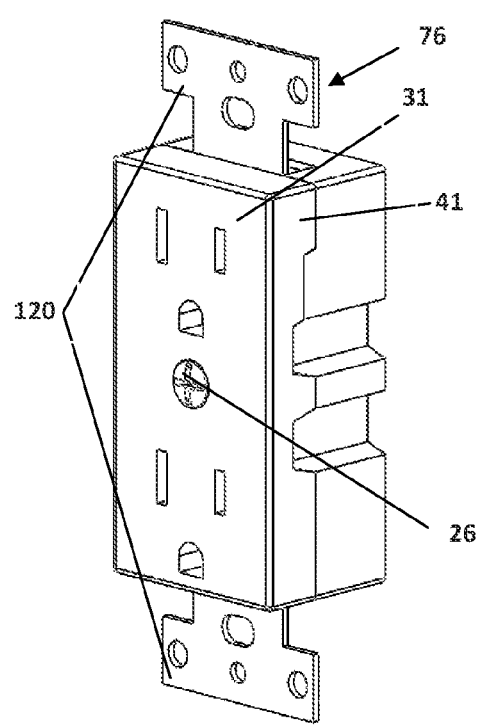
FIGS. 16A & 16B depict, respectively, first and second positions of a first particular embodiment of an adjustable mounting electrical device with a turn screw.
Figure 16B:
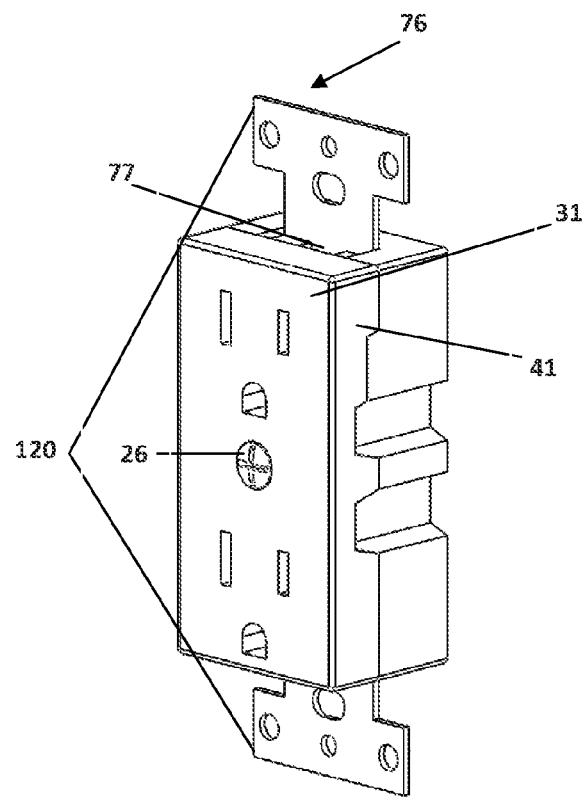
Figure 17D:
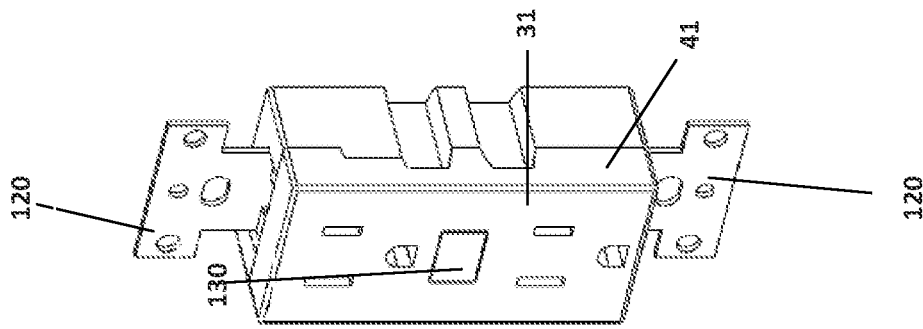
FIGS. 17A-17D depict, respectively, multiple positions of a second particular embodiment of an adjustable mounting electrical device with a turn screw.
Figure 17C:
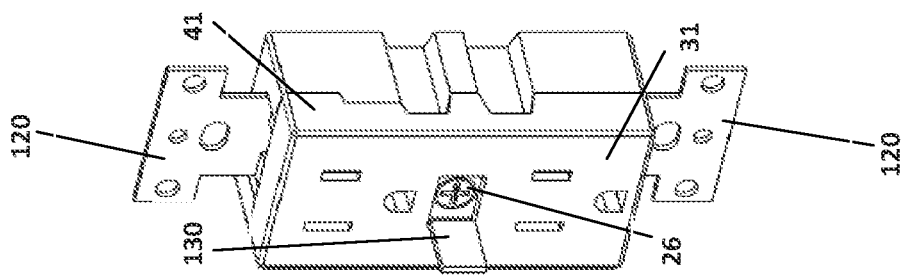
Figure 17B:
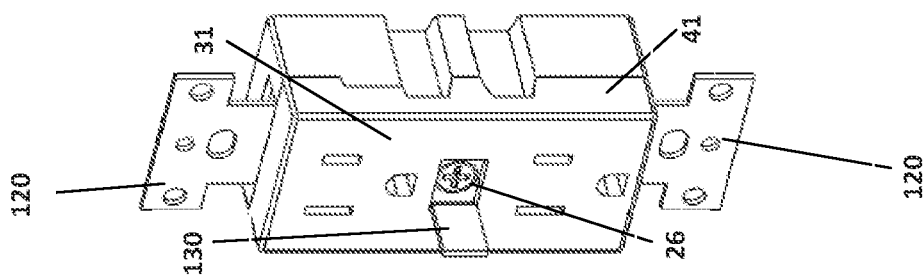
Figure 17A:
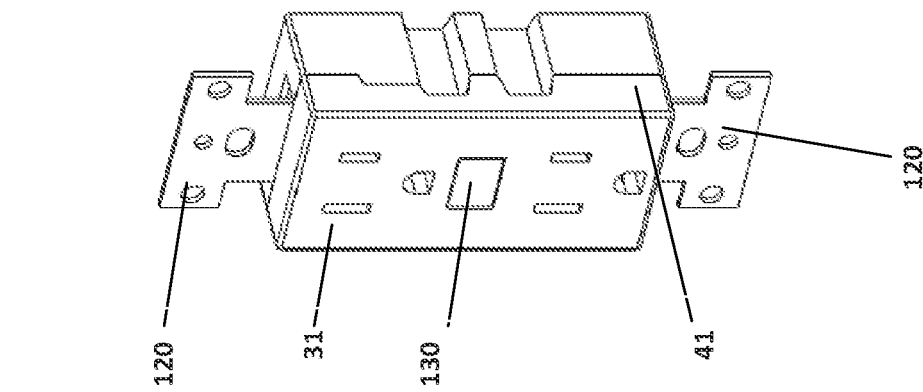

FIGS. 16A and 16B depict another particular implementation of an adjustable mounting electrical device wherein a center adjustment screw 26 correspondingly adjusts the adjustable yokes 76 and their mounting flanges 120 of the electric device 41 forward and backward in a direction perpendicular to the face 31 of the electrical device 41 and the front face of the electrical box 50. By trapping the front-to-back positioning of the center adjustment screw 26 in relation to the face 31 of the electrical device 41, twisting the center adjustment screw 26 which is threadedly engaged with the yoke 76, for example through the strap 77, causes the adjustable yoke 76 to move in relation to face 31 of the electrical device 41. FIG. 16A shows the forward position and FIG. 16B shows the backward position.

FIGS. 17A through 17D illustrate another particular implementation of an adjustable mounting electrical device similar to the particular implementation of FIGS. 16A and 16B, having a center adjustment screw 26 that correspondingly adjusts the yokes 76 forward and backward in a direction perpendicular to the face 31 of the electrical device 41 and the front face of the electrical box 50, but further including a center flap 130 or other detachable cover that conceals the adjustment screw 26 from view when it is not in use. Progression from FIG. 17A to FIG. 17D illustrate, respectively, an electrical device 41 with the center flap 130 closed, opening the center flap 130, adjusting the adjustment screw 26 to move the yokes 76 from a forward position to a backward position, and closing the center flap 130.

Figure 18A:
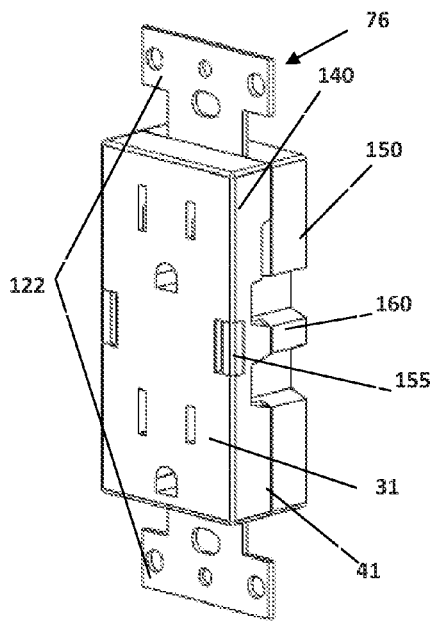
FIGS. 18A & 18B depict, respectively, first and second positions of a particular implementation of an adjustable mounting electrical device with release tabs.
Figure 18B:
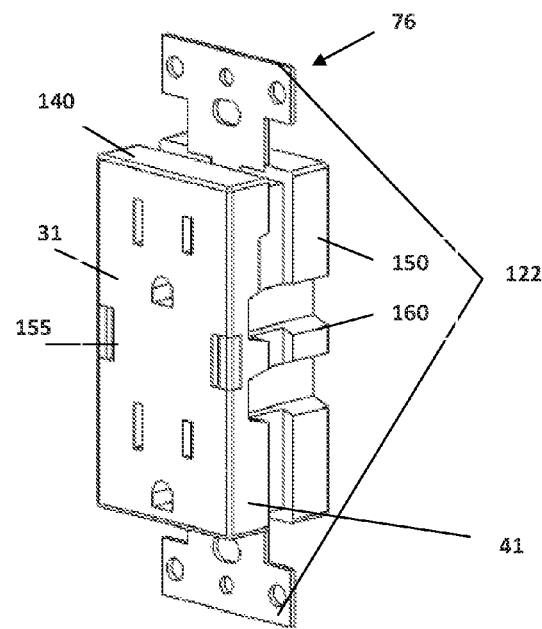
Figure 19A:
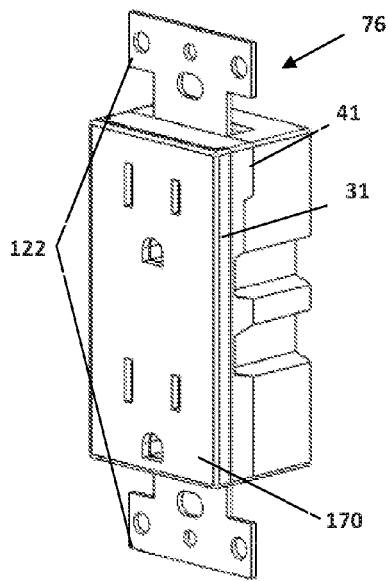
FIGS. 19A-19D depict multiple views of a particular implementation of an adjustable mounting electrical device with multiple turn screws.
Figure 19B:
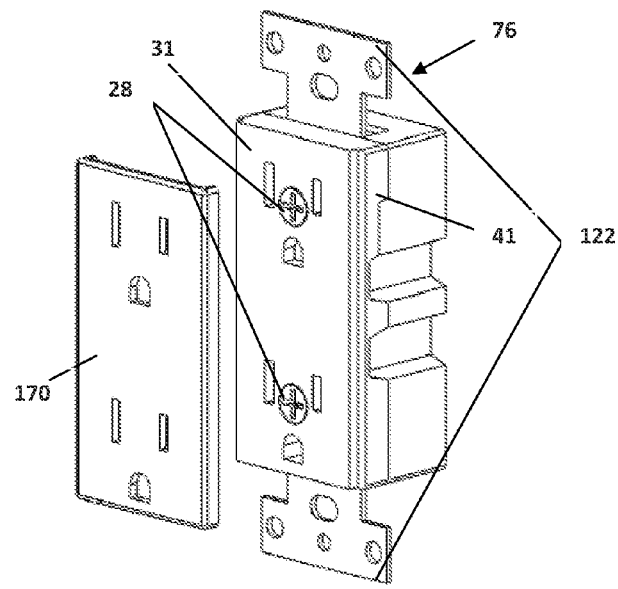
Figure 19C:
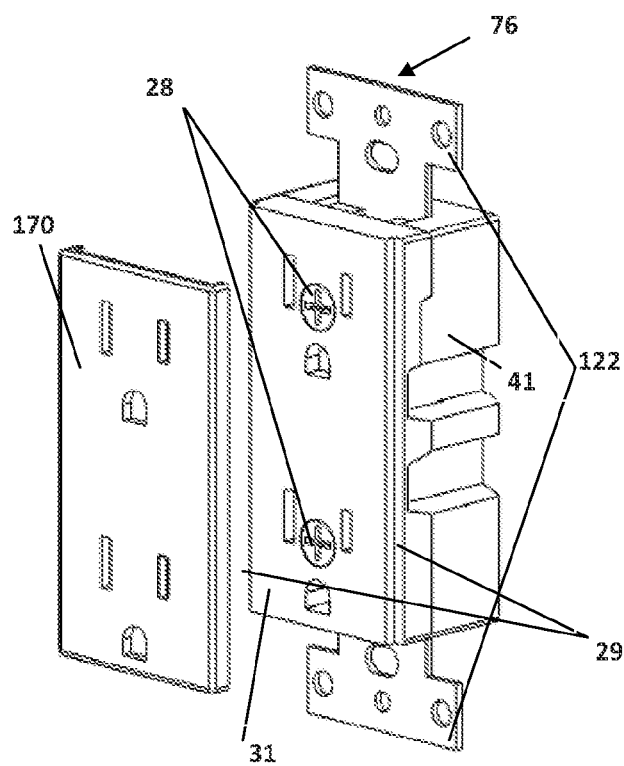
Figure 19D:
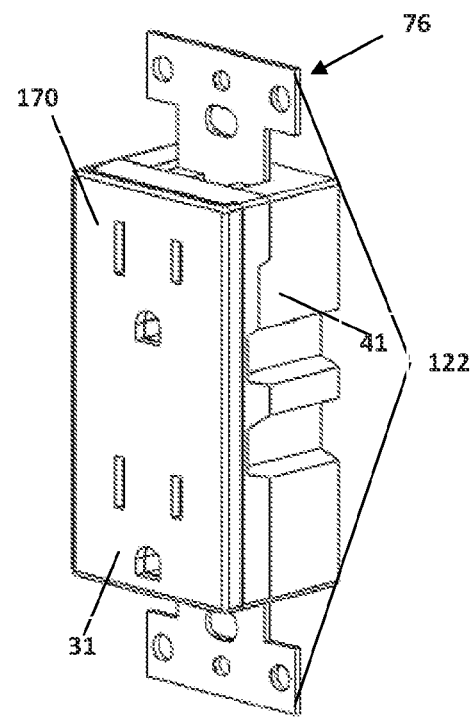

FIGS. 18A and 18B illustrate a particular implementation of an adjustable mounting electrical device wherein the electrical device 41 has a front shell 140 and a back shell 150 in addition to the yokes 76 with mounting flanges 122. The back shell 150 and yokes 76 are moveable on a track 160 that runs between the front 140 and back shells 150 when one or more side buttons 155 are depressed to allow for free movement along the track 160. The front shell 140 of this particular implementation is adjustable in relation to the yoke 76 by a user squeezing the opposing depressible side buttons 155 on either side of the face 31 of the electrical device 41 to temporarily release the front shell 140 from its fixed relationship to the back shell. Release of the opposing side clips 155 causes the clip structure to re-engage the back shell 150 and fix the position of the front shell 140 in relation to the back shell. Thus, the relative spacing between the adjustable yokes 76 of the electrical device 41 and the face 31 of the electrical device 41 can be adjusted.

FIGS. 19A through 19D illustrate an application of an adjustable mounting electrical device having a false front or cover 170 that snaps onto the front face 31 of the electrical device 41 to conceal the adjustment screws 28 or other mechanism from view. Like the particular implementation of FIGS. 16A-16B and 17A-17D, adjustment of the adjustment screw 28 adjusts the adjustable yoke 122 in its positional relationship to the face 31, but in this particular implementation, the two adjustment screws 28 adjust each of the yokes 122 separately. The cover plate 170, like the cover flap of FIGS. 17A-17D, hide the adjustment screws 28 after adjustment. Channels 29 in the face 31 of the electrical device receive edges of the cover 170. This particular implementation uses two screws adjustment screws 28 that allow adjustment of the mounting flanges 122 of the yoke 76 to move forward and backward in a direction perpendicular to the front face 31 of the electrical device 41. By using two separate adjustment screws 28, both the top and the bottom of the electrical device can be adjusted separately.

Figure 20A:
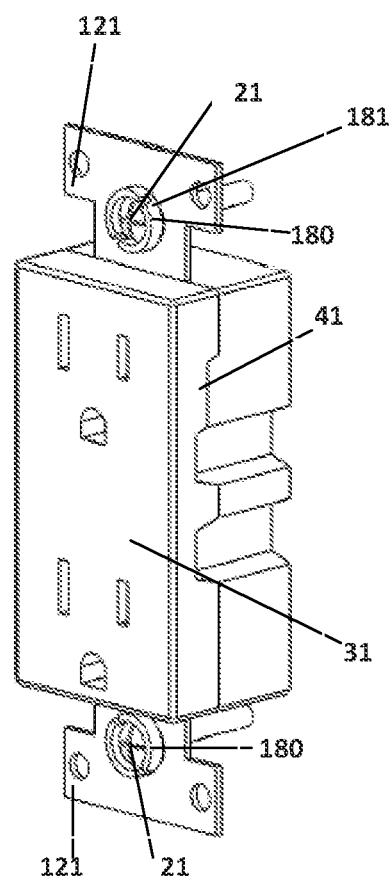
FIGS. 20A & 20B depict, respectively, first and second positions of a particular implementation of an adjustable mounting electrical device with adjustable box mounting screw mounts.
Figure 20B:
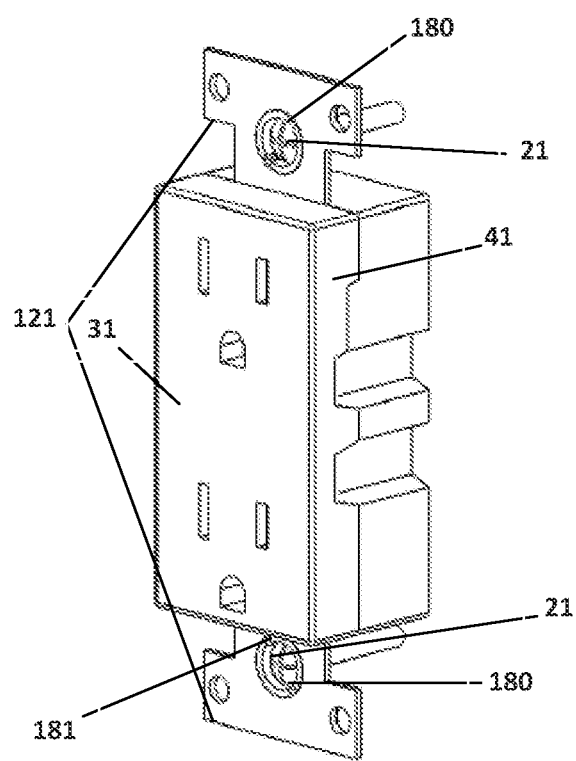

FIGS. 20A and 20B illustrate another implementation of an adjustable electrical device comprising at least one adjustable holder 180 for the box mounting screw 21. Each adjustable holder 180 is threadedly coupled with one of the two yokes 121. The holder 180 comprises a slot 181 extending through walls of the holder and a center recess to receive a box mounting screw 21. After, or while, coupling the box mounting screw 21 to the electrical box, an installer can adjust the position of the yoke relative to the front of the electrical box by rotating the holder 180 to cause it to extend further into one or both of the yokes 121 (FIG. 20B) or retract farther out of one or both of the yokes 121 (FIG. 20A). When the holder 180 extends farther into the yokes 121, the back side of the holder 180 contacts the support surface behind the yokes 181 (usually the electrical box), and adjusts the yokes 121 away from the electrical box to effect an adjustment in the relative supported positioning between the electrical box and the face 31 of the electrical device 41.

The particular yoke implementation of FIGS. 21 and 22 illustrate a yoke and strap assembly 205 with the other electrical device portions removed for convenience of illustration. This particular yoke implementation can be used with an adjustable mounting electrical device having a threaded, cover plate screw hole 200 that allows for solid seating and correct placement of the plate screw relative to the electrical box 60 (FIG. 2) regardless of whether the front face of the electrical box 60 is flush with the wall surface 63 (FIG. 2) or the electrical box 60 has been installed too far back in the wall, thereby preventing the yoke 205 from sitting on the front of the wall surface 63. Because the plate screw hole 200 is fixed in relation to the yoke and strap assembly 205 and does not move with the adjustable yoke 15, the plate screw hole 200 is in correct placement for a face plate after the adjustable yoke 15 have been adjusted. Although not limited to this configuration, this and other implementations of an adjustable mounting electrical device are depicted here as having a box mounting screw 190 located at approximately the center of adjustable yoke 15 and an adjustment screw 20 located off-center to one side of the box mounting screw 190. Similar to the embodiment illustrated in FIG. 3, the off-center adjustment screw 20 threadedly engages the strap 70 of an electrical device to allow the adjustable yoke 15 of the yoke and strap assembly 205 to adjust in relation to the electrical device. The box mounting screw 190 is aligned with the box mounting screw apertures of a conventional electrical outlet box. Those of ordinary skill in the art will readily understand how to apply the principles associated with this particular yoke and strap assembly 205, illustrated in FIGS. 21 and 22, to the various other implementations illustrated herein and in other implementations of electrical devices known in the art.

Figure 23B:
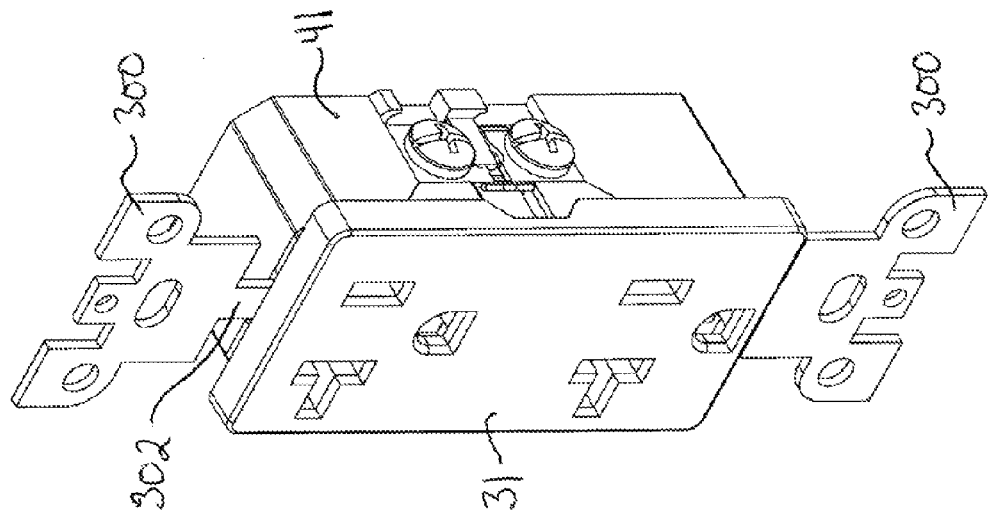
FIGS. 23A & 23B depict, respectively, first and second yoke positions for an adjustable mounting electrical device.
Figure 23A:
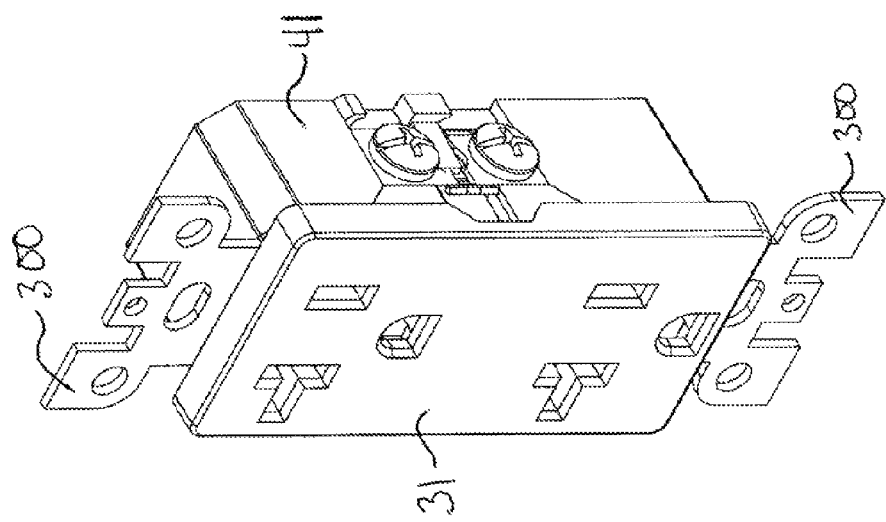

FIGS. 23A and 23B illustrate another particular implementation of an adjustable yoke 300 of an electrical device 41 with an electrical device face 31, the adjustable yoke 300 being adjustable vertically up or down in relation to the electrical device face 31. Sometimes, when electrical devices are installed, although the electrical box is a fixed size, it is desirable to adjust the vertical positioning of the electrical device slightly. Additionally, if the electrical box is deformed, the electrical device mounting screw apertures of the box may not be properly aligned or positioned. Having the ability to adjust the yokes up or down allows an installer to correct for these problems. This feature may be used alone or added to other implementations disclosed herein. The yokes 300 may comprise an extendable neck 302 that remains electrically coupled to the strap (not shown), and consequently each other, and slidably moves in relation to the electrical device 41 housing and face 31. Although the particular implementation disclosed here illustrates the yokes 300 being independently adjustable, it is specifically contemplated that in particular implementations the yokes 300 may be fixedly coupled together such that their positional relationships to each other do not change and they slide up and down as a common unit.

Figure 24B:
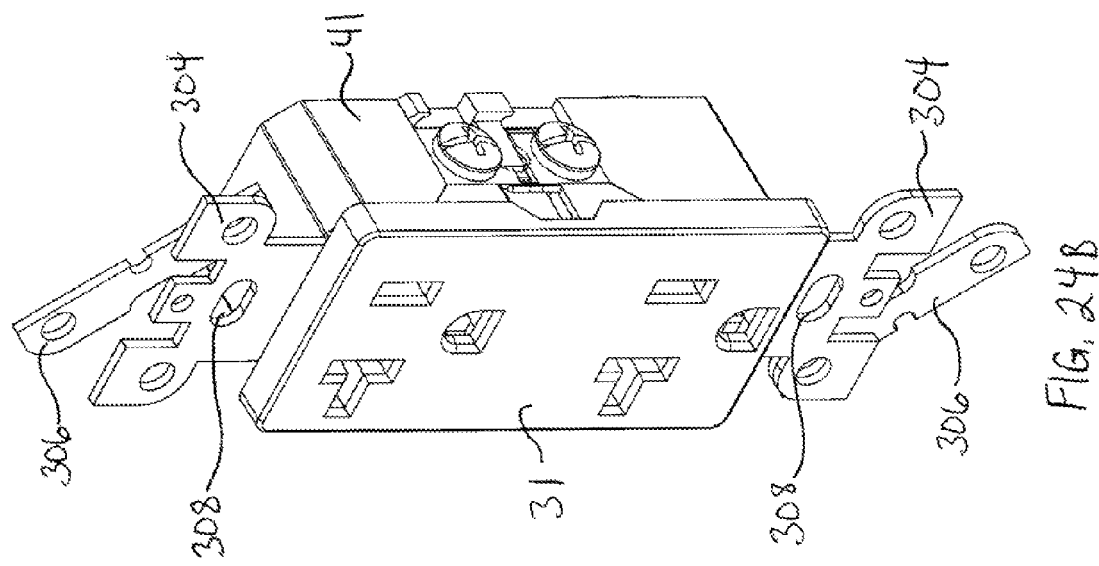
FIGS. 24A & 24B depict, respectively, first and second spacer positions of a first embodiment of an integral adjustable yoke spacer.
Figure 24A:
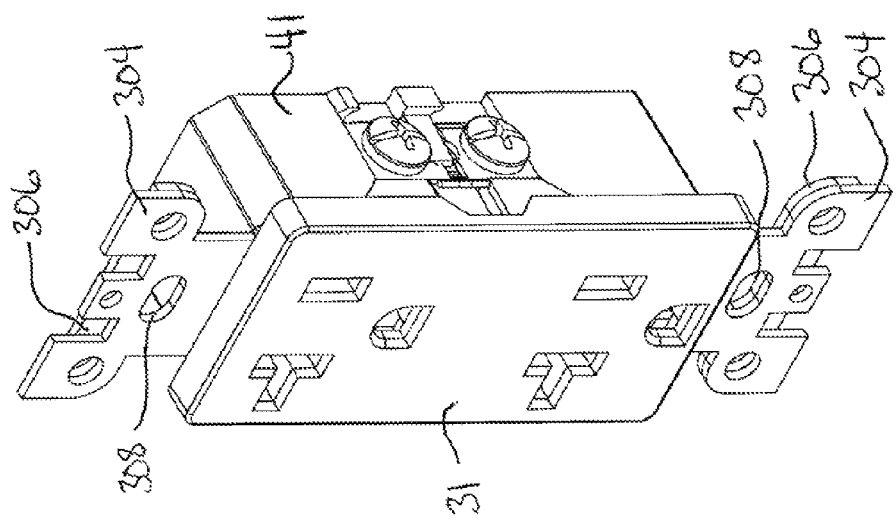

FIGS. 24A and 24B illustrate another particular implementation of an adjustable yoke 304 of an electrical device 41 with a face 31. In this particular implementation, a pivoting and/or removable spacer 306 is coupled to a back surface of the yoke 304. The spacer 306 may be coupled into an aperture of the yoke 304 to allow for pivoting, or coupled elsewhere to the yoke 304. By including the spacer 306 as coupled directly to the yoke 304, spacing between the box mounting aperture 308 of the yoke and the electrical box can be quickly adjusted during installation.

Figure 25B:
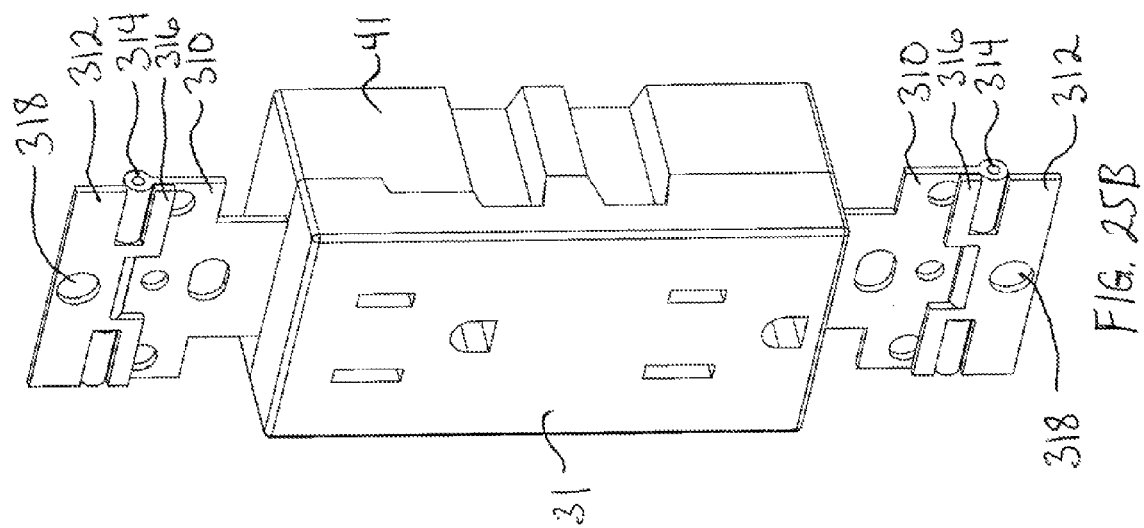
FIGS. 25A & 25B depict, respectively, first and second extender positions of an implementation of an integral yoke extender and spacer.
Figure 25A:
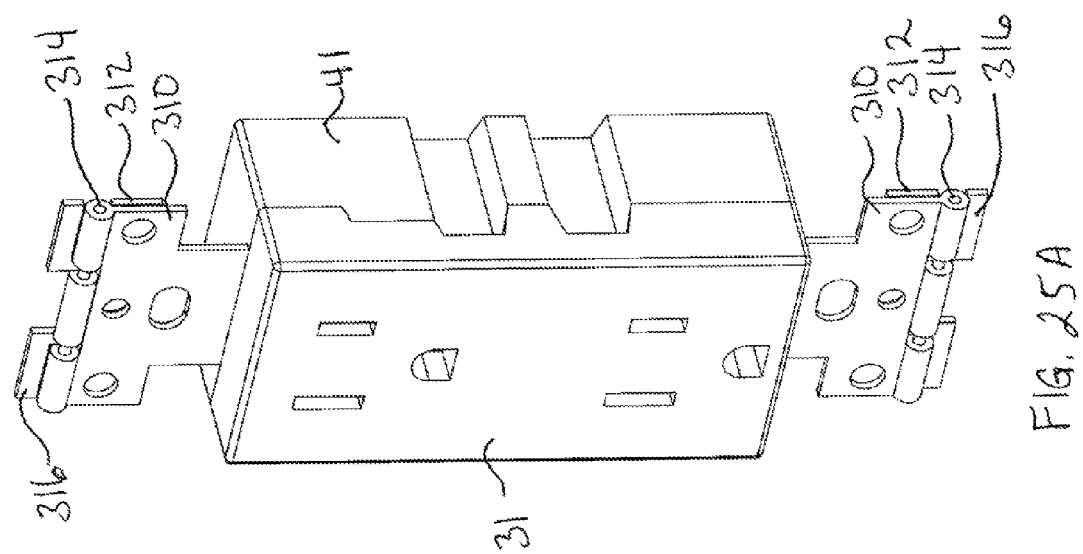

FIGS. 25A and 25B illustrate another particular implementation of an adjustable yoke 310 of an electrical device 41 with a face 31. In this particular implementation, a pivoting spacer 312 is hingedly coupled to the yoke 310 through hinge 314 such that the spacer 312 can pivot between a collapsed position (FIG. 25A) in which the spacer 312 is positioned between the yoke 310 and an electrical box, and an extended position (FIG. 25B) in which the spacer 312 is positioned above the yoke 310. The box mounting screw aperture 318 of the spacer 312 aligns with the box mounting screw aperture of the yoke 310 when in the collapsed position and is above the yoke 310 in the extended position. An installer installing the electrical device 41 can use the spacer 312 to add a little more space between the yoke 310 and the electrical box or use the spacer's box mounting screw aperture 318 to mount into a different aperture in a different space if needed, providing two levels of versatility.

Figure 26A:
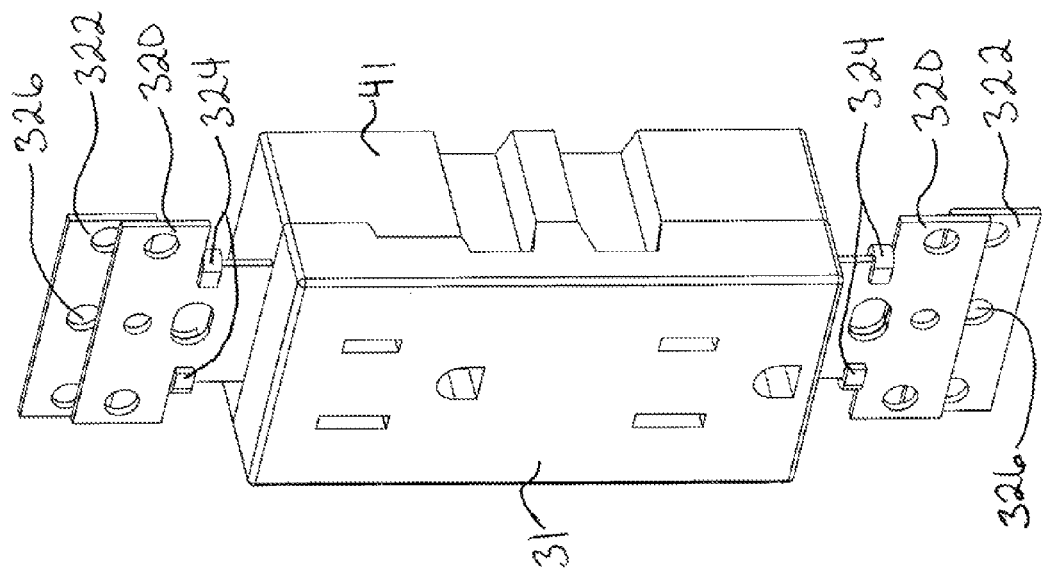
FIGS. 26A & 26B depict, respectively, first and second extender positions of an implementation of an adjustable yoke extender.
Figure 26B:
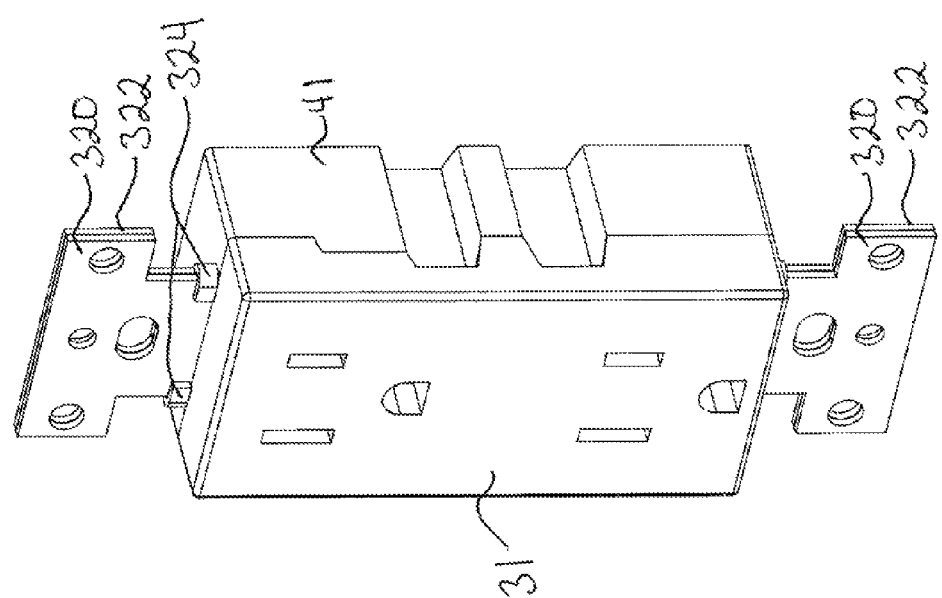

FIGS. 26A and 26B illustrate another particular implementation of an adjustable yoke 320 of an electrical device 41 with a face 31. In this particular implementation, a sliding spacer 322 is slidably coupled to the yoke 320 through sliding clips 324 grasping sides of the yoke 320 such that the spacer 322 can slide between a collapsed position (FIG. 26A) in which the spacer 322 is positioned immediately behind the yoke 320, and an extended position (FIG. 26B) in which the box mounting screw aperture 326 of the spacer 322 is positioned partially above the yoke 320. The box mounting screw aperture 326 of the spacer 322 aligns with the box mounting screw aperture of the yoke 320 when in the collapsed position. An installer installing the electrical device 41 can extend the spacer 322 and use its box mounting screw aperture 326 to mount into a different aperture in a different space if needed. Alternatively, if the additional spacing is not needed behind the yoke 320, the spacer clips 324 can be pried from the yoke 320 so that the spacer 322 is removed from the yoke 320.

FIGS. 27A and 27B illustrate another particular implementation of an adjustable yoke 320 of an electrical device 41 with a face 31. In this particular implementation, a removable spacer 328 is coupled to a back surface of the yoke 320 by one or more clips 332 extending around a front side of the yoke 320. Optional tracks 330 may be employed to grip the sides of the yoke 320 to help align the box mounting screw aperture 334 of the removable spacer 328 with the box mounting screw aperture of the yoke 320. Use of this or other spacers behind the yoke extend the back surface of the yoke and the box mounting screw aperture of the yoke farther away from the face 31 of the electrical device 41.

Figure 28:
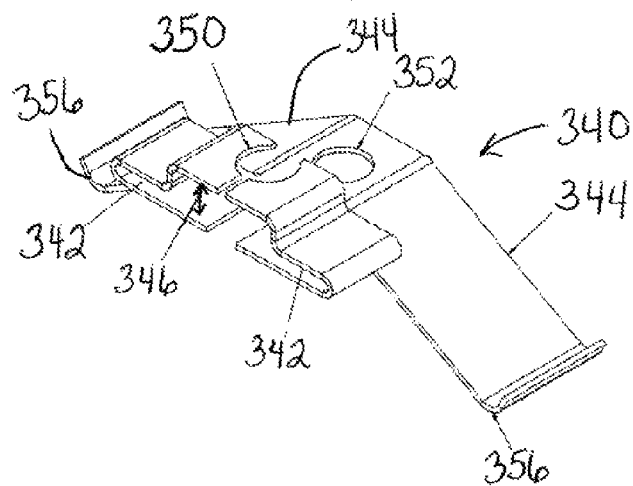
FIG. 28 depicts a perspective view of a first embodiment of a yoke adjustment spring.
Figure 31:
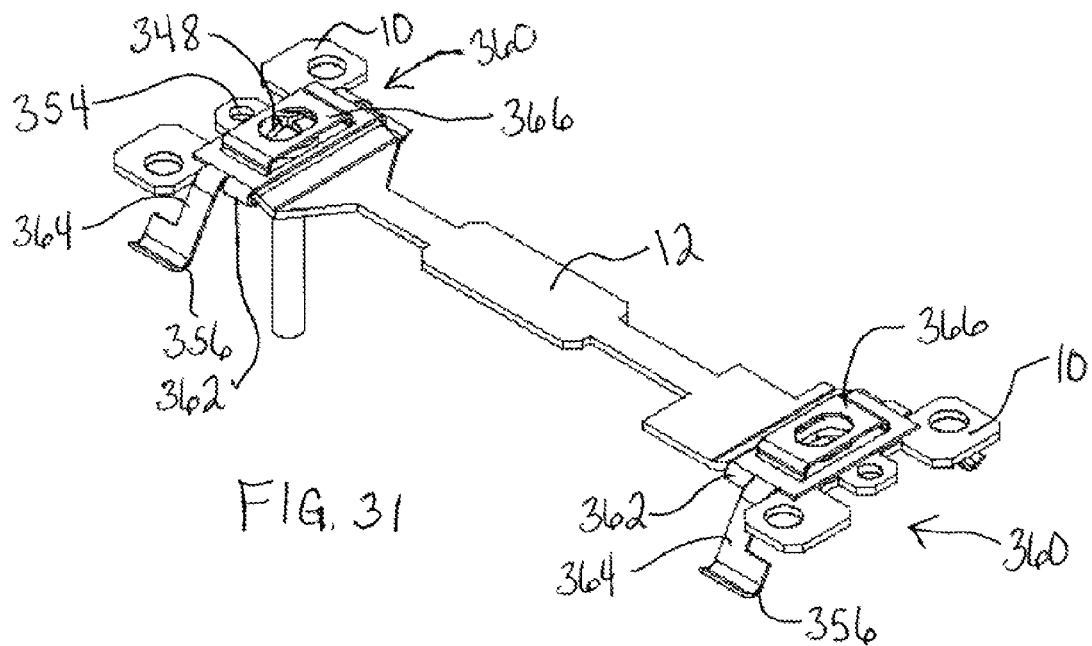
FIG. 31 depicts a pair of yoke adjustment springs of a second embodiment mounted on a yoke.
Figure 29:
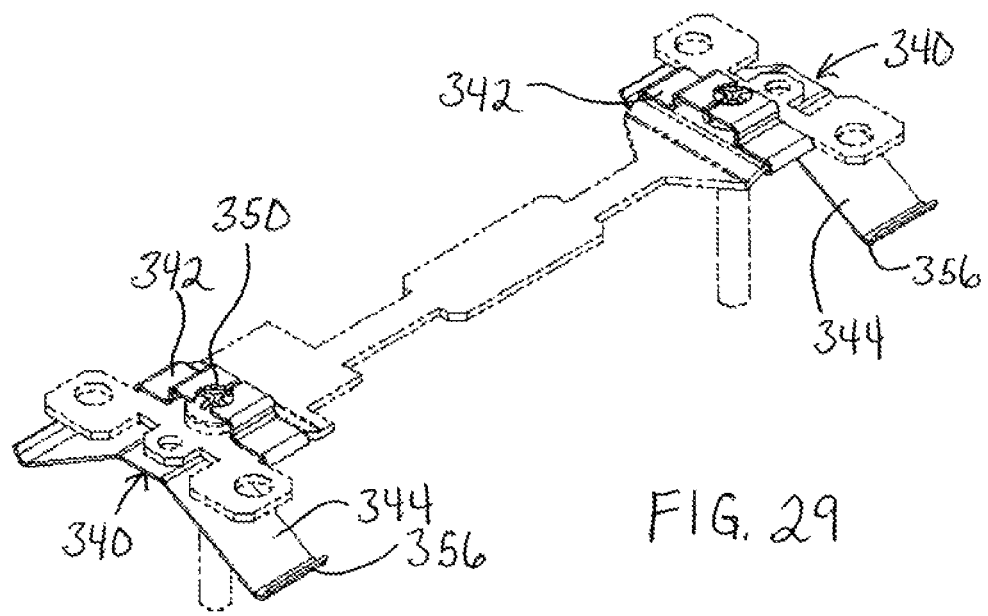
FIG. 29 depicts a perspective view of a pair of the yoke adjustment springs of FIG. 28 mounted of on a yoke.
Figure 30:
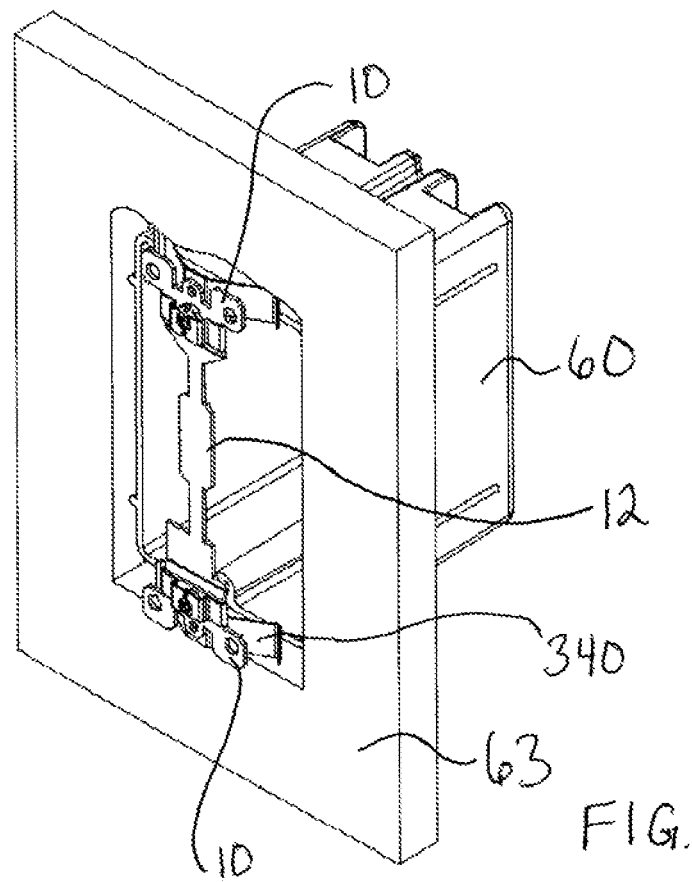
FIG. 30 depicts the yoke of FIG. 29 mounted in an electrical box.

FIGS. 23 to 33 illustrate a particular implementation of an adjustment spring for a yoke 10 of an electrical device (such as that shown in any of the implementations shown or described herein). For these illustrations, the electrical device portions other than the yokes 10 and the strap 12 are removed for simplicity of illustration and to show that a strap 12 of an electrical device typically extends between the yokes 10 and provides electrically conductive continuity between them. There are often misalignment issues when installing electrical devices into a wall 63 into which an electrical box 60 is mounted (FIG. 30). As a result, the electrical device and cover plate are also often misaligned. FIG. 28 illustrates a first implementation of a spring spacer 340 comprising opposing clips 342 flexibly configured so as to couple the spring spacer 340 to the yoke 10 by gripping a portion of the yoke 10. Because there is a space between the clips 342, the spacer 340 can be mounted to the yoke 10 after the yoke 10 is mounted in the electrical box 60. Two spring walls 344 extend backward and outward from the clips 342 and provide the spring spacing action of the spacer 340. The gap 346 between the front and back portions of the clips 342 expands toward the center and surrounds and retains the head of the box mounting screw 348 (FIG. 31). This prevents the spring spacer 340 from flexing inward when the user pushes on the electrical device, such as pushing a plug into the receptacle. Aperture 350 in the front of the clips 342 gives the installer access to the box mounting screw head for installation and adjustment of the electrical device. The plate screw aperture 352 between the two spring walls 344 gives the installer access to the cover plate screw apertures 354 on the yoke (FIG. 31). Optionally, curved ends 356 of the two spring walls 344 may be added to allow the spring to easily slide over the installation surface while the installer is adjusting the box mounting screw 348 to properly position the electrical device.

Figure 32:
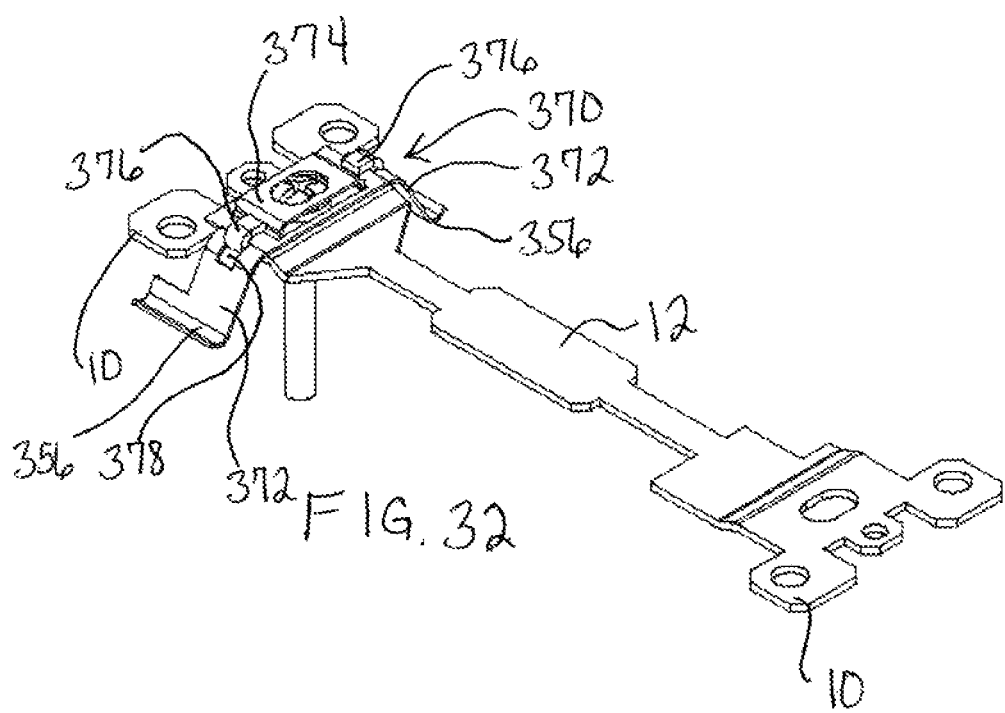
FIG. 32 depicts a yoke adjustment spring of a third embodiment mounted on a yoke.
Figure 33:
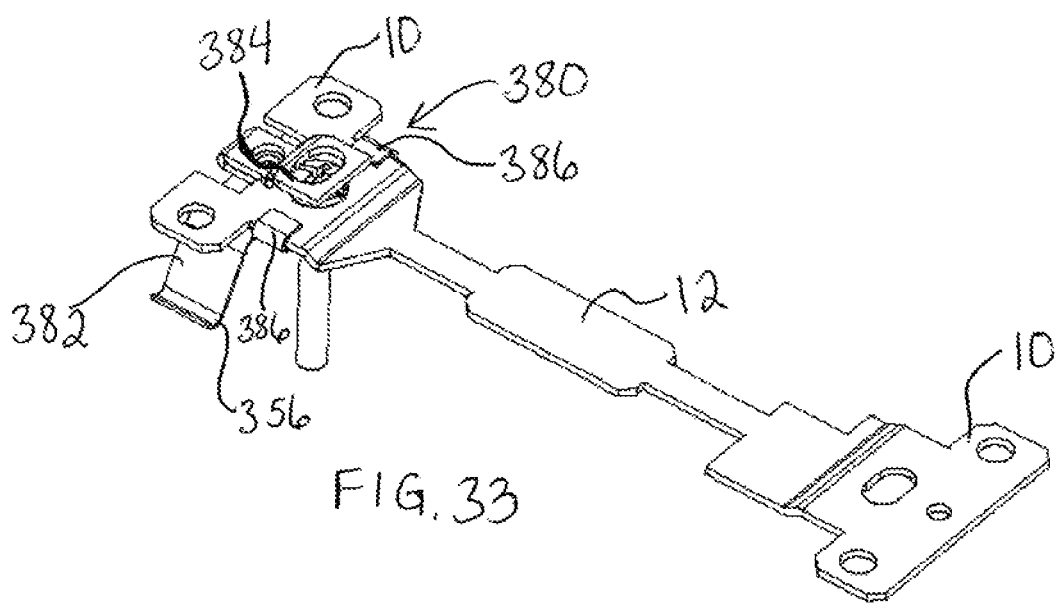
FIG. 33 depicts a yoke adjustment spring of a fourth embodiment mounted on a yoke.

Specifically, FIG. 29 illustrates the adjustment spring 340 of FIG. 28 coupled to a yoke, and FIG. 30 illustrates the same adjustment spring 340 implementation coupled to an electrical box 60 mounted in a wall 63. FIG. 31 illustrates a slightly different implementation of an adjustment spring 360 where the adjustment spring 360 couples to the yoke 10 from the front side of the yoke 10 rather than the back side (as in FIGS. 29 and 30). In this implementation, the clips 362 extend from the front to the back of the yoke 10. The box mounting screw 48 retainer 366 is also configured a little differently, but still retains the box mounting screw 348 to the yoke 10 when the user pushes on the electrical device. FIG. 32 illustrates a third implementation of an adjustment spring 370 comprising two spring walls 372 with curved ends 356 like with previous implementations, but the box mounting screw retainer 374 comprises extending clips 376 configured to extend through apertures 378 in the adjustment spring 370 to couple the adjustment spring 370 to the yoke 10 and simultaneously hold the spring walls 370 to the yoke 10. FIG. 33 illustrates a fourth implementation of an adjustment spring 380 comprising two spring walls 382 with curved ends 356 like with previous implementations, but the adjustment spring 380 comprises extending clips 386 extending form a back side of the yoke 10 to the front side around the sides of the yoke 10, and the box mounting screw retainer 384 also extends from the back side of the yoke 10 to the front side around the top of the yoke 10. Any of the particular implementations of an adjustment spring may be incorporated with the electrical device at manufacture, or added later by bending the clips around the yoke to assemble it. If the installer determines that the adjustment spring is unneeded or undesired, if pre-installed, the installer need only bend the clips out of the way to allow the adjustment spring to be removed or remove the ears of the yoke to allow the adjustment spring to slide off the end of the yoke.

Figure 34A:
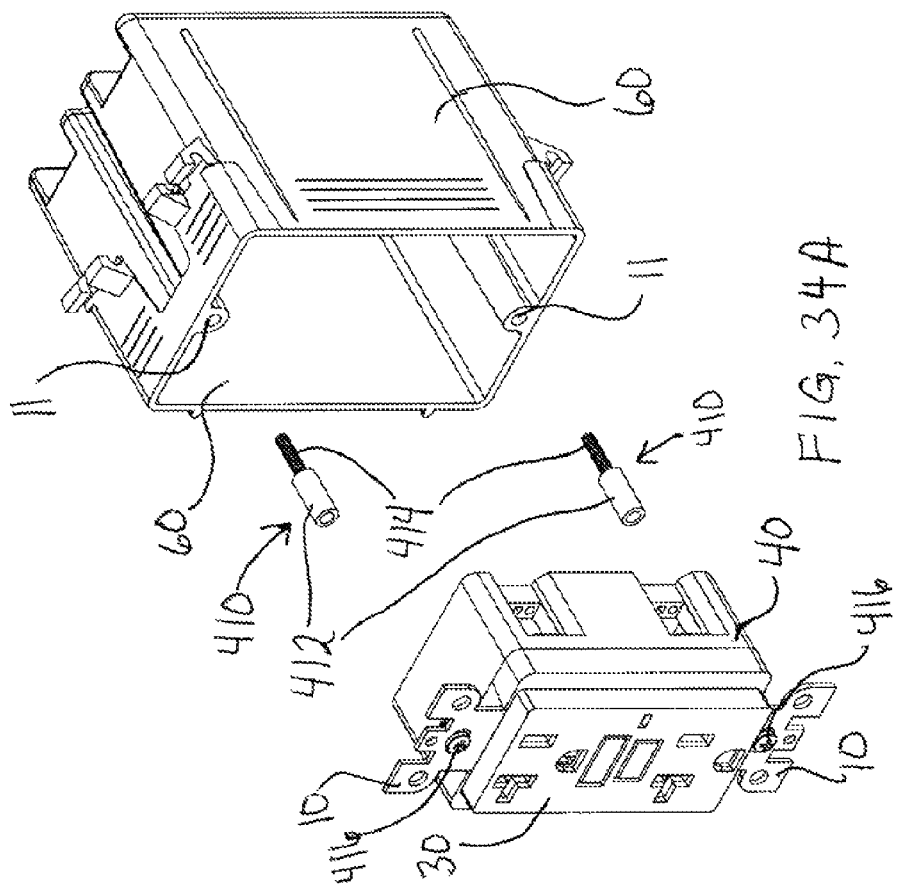
FIGS. 34A & 34B depict, respectively, exploded and assembled perspective views of an electrical device with box mounting screw extender screws.
Figure 34B:
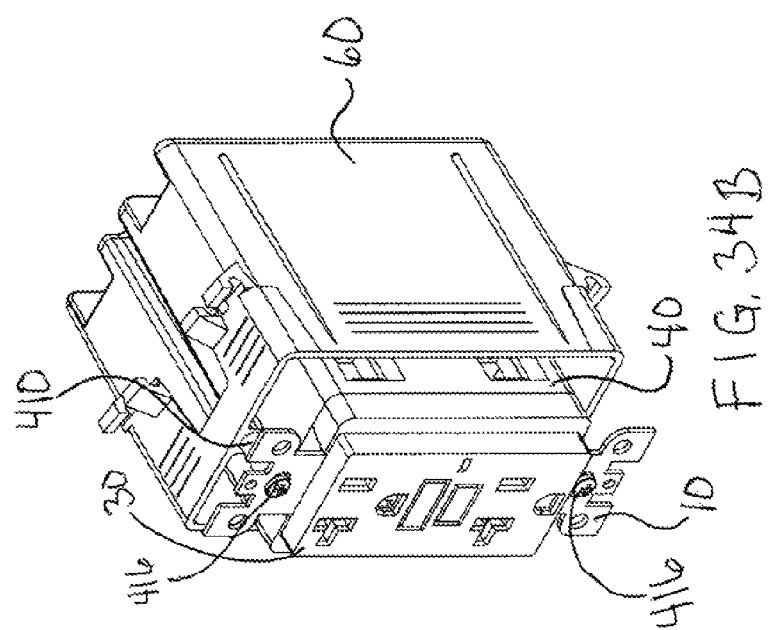

FIGS. 34A and 34B illustrate, respectively, exploded and assembled views of an electrical device 40 with a face 30 and yokes 10 being coupled to an electrical box 60 having electrical box mounting screw aperture bosses 11. Ordinarily, when an electrical device 40 is installed in an electrical box 60, the back side of the yoke 10 should be flush against the electrical box mounting screw aperture bosses 11 to provide safe support for the electrical device 40. If the electrical box 60 is not properly installed in the wall, however, this flush arrangement is not always possible. The particular implementation of FIGS. 34A and 34B illustrate an example of a spacer 410 comprising a threaded post 414 externally threaded and sized to match that of an ordinary box mounting screw, and an extender post 412 internally threaded and sized to receive a box mounting screw 416 for the electrical device. In use, the spacer 410 is threadedly coupled to both the electrical box mounting screw 416 and to the electrical box mounting screw aperture bosses 11 with the extender post 412 being positioned between the bosses 11 and the back side of the yoke 10. This provides an extension of the support of the electrical box 60 through the extender post 412 to the yoke 10.

Figure 35A:
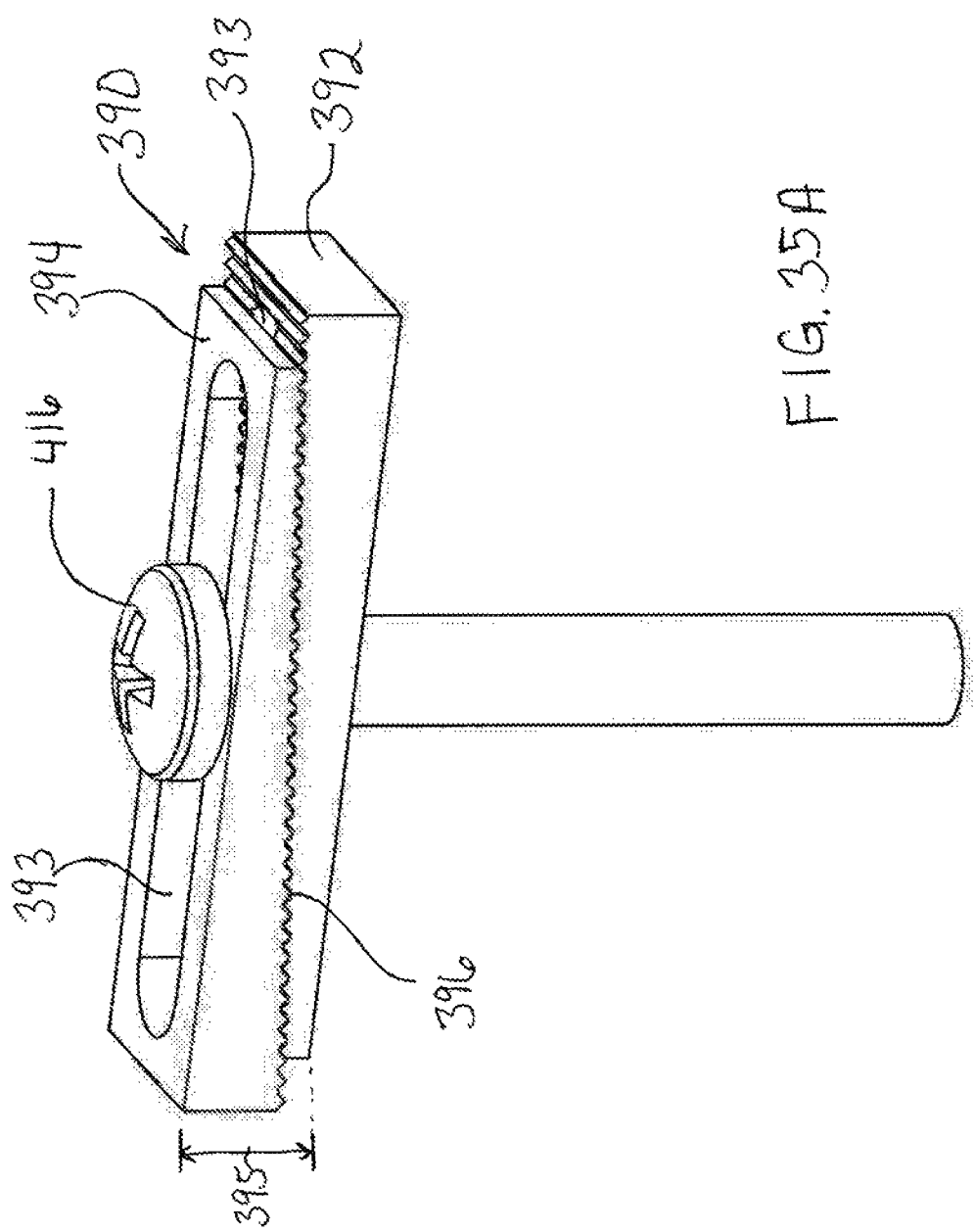
FIGS. 35A-35C depict multiple views of a first particular embodiment of an adjustable spacer for a box mounting screw of an electrical device.
Figure 35B:
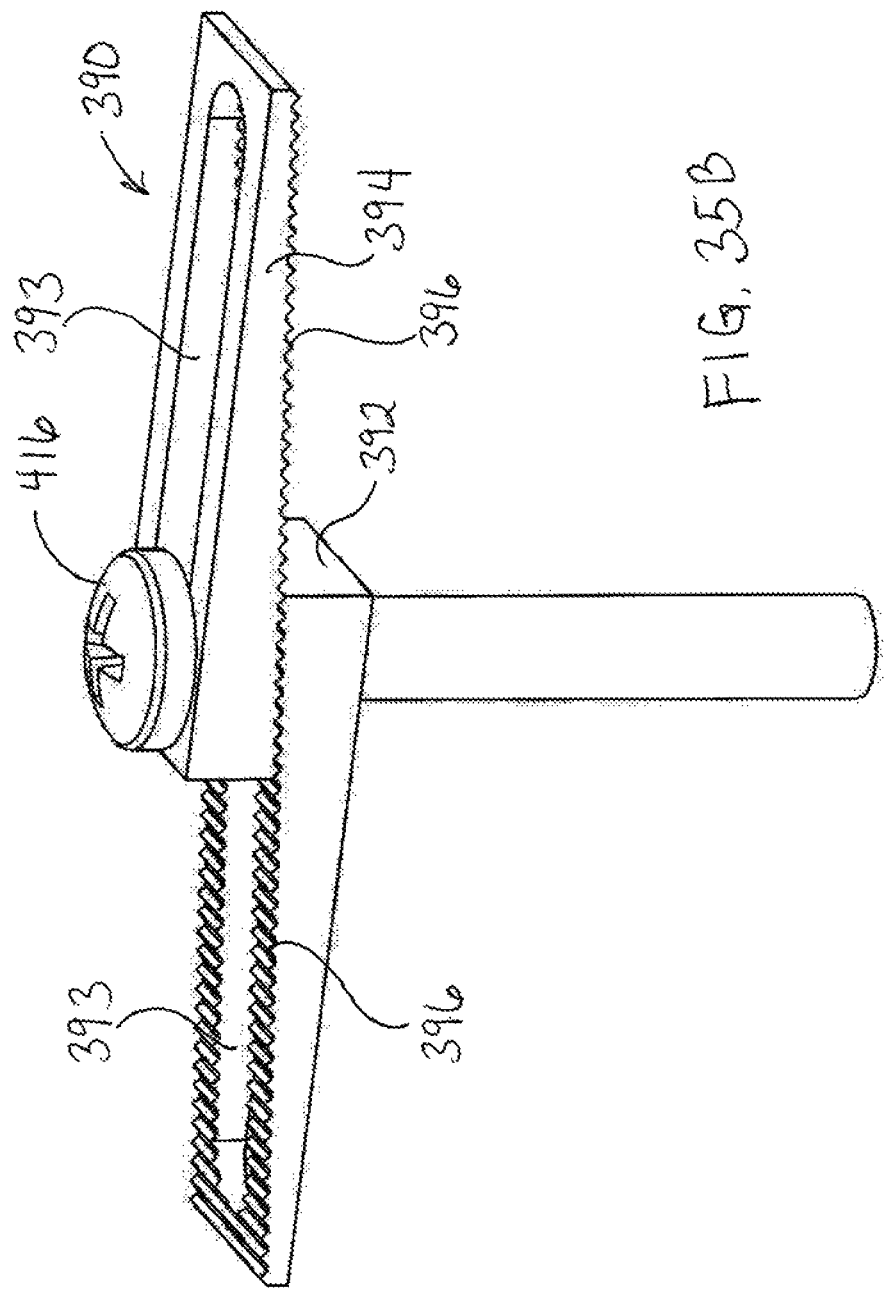
Figure 35C:
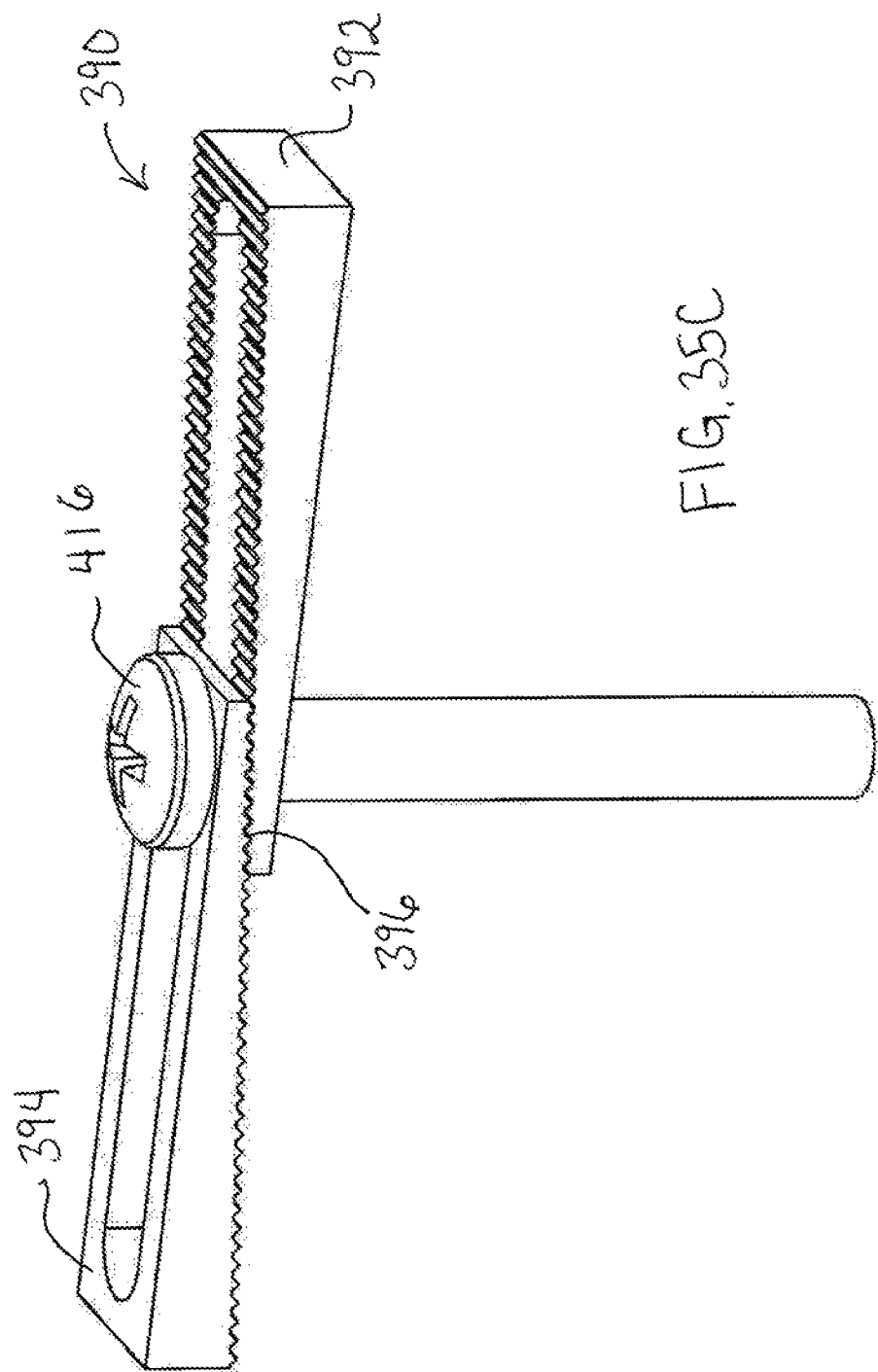

FIGS. 35A-35C illustrate another particular implementation of a spacer 390, to be applied like that of FIGS. 34A and 34B, but having a different, adjustable configuration. Although the illustrations in FIGS. 35A-35C are not shown specifically in association with an electrical box 60 and electrical device 40 (FIGS. 34A and 34B), it should be understood that the particular spacer 390 may be applied to any electrical box and electrical device combination described in this disclosure. The spacer of FIGS. 35A-35C comprise first and second angled spacer parts 392, 394 having mating surfaces 396 to resist movement between the surfaces 396 when mated. Each of the spacers 392, 394 comprises a slot 393 extending through it. The spacer 390 may be placed between the back side of the yoke 10 and the electrical box 60 (FIGS. 34A and 34B) with the box mounting screw 416 extending through the slot 393 of each angled spacer part 392, 394 with their mating surfaces 396 facing each other. The mating surfaces 396 may comprise any mating surface from a smooth surface, to a textured surface or other structured surface like the teeth illustrated in the example. Textured or structured surfaces are less likely to allow the spacer to shift its size once the box mounting screw 416 is tightened on the yoke 10. In use, if additional space is needed between the yoke 10 and the electrical box 60 due to a misaligned electrical device or poor support behind the yoke 10, a spacer 390 may be added. To increase the depth 395 of the spacer (FIG. 35B), the spacer parts 392, 394 may be adjusted so their thicker portions are together. To decrease the depth 395 of the spacer (FIG. 35C), the spacer parts 392, 394 may be adjusted so their thinner portions are together.

The spacer 398 implementation of FIGS. 36A-36C operates like and is structured like the implementation of FIGS. 35A-35C with the exception that an installation aperture 406 is included in each of the two spacer parts 400, 402. The mating surfaces 404 of the two spacer parts 400, 402 still engage each other to resist a change in the depth 395 of the spacer 398 when the box mounting screw 416 is tightened against the yoke 10. The installation aperture 406 allows an installer to install a spacer 398 after the box mounting screw 416 is mounted in the electrical box 60 without removing the box mounting screw 416. The installation aperture 406 of each of the two spacer parts 400, 402 (FIG. 36C) can be placed around the shaft of the box mounting screw 416 to install the spacer 398 on the box mounting screw 416. In use, if additional space is needed between the yoke 10 and the electrical box 60 due to a misaligned electrical device or poor support behind the yoke 10, a spacer 398 may be added. To increase the depth of the spacer (FIG. 36B), the spacer parts 400, 402 may be adjusted so their thicker portions are together. To decrease the depth of the spacer (FIG. 36C), the spacer parts 400, 402 may be adjusted so their thinner portions are together.

It will be understood that implementations are not limited to the specific components disclosed herein, as virtually any components consistent with the intended operation of a method and/or system implementation for a disclosed device may be utilized. Components may comprise any shape, size, style, type, model, version, class, grade, measurement, concentration, material, weight, quantity, and/or the like consistent with the intended operation of a method and/or system implementation.

The concepts disclosed herein are not limited to the specific implementations shown herein. For example, it is specifically contemplated that the components included in a particular implementation may be formed of any of many different types of materials or combinations that can readily be formed into shaped objects and that are consistent with their intended operation. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, components of particular implementations may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations, it should be readily apparent that a number of modifications may be made without departing from the spirit thereof and that these implementations may be applied to other implementations. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An adjustably mountable electrical device comprising:
   an electrical device comprising an electrical device housing, an electrical device face on a front side thereof, and a yoke adjustably mounted at each of two opposing sides of the electrical device housing, the yokes each having a front side and a back side and an electrical box mounting screw aperture positioned along a vertical center axis of the electrical device to align with electrical box mounting screw bosses of an electrical box adjacent the yoke, a horizontal distance between the electrical device face and the electrical box mounting screw aperture of each yoke defining an electrical device mounting depth for that yoke;
   wherein the yokes are adjustably mounted, through rotational adjustment of one or more adjustment screws positioned off-center of the vertical center axis, such that the electrical device mounting depths for the yokes are adjustable to increase or decrease the horizontal distance between the electrical device face and the electrical box mounting screw apertures of the yokes.

2. The adjustably mountable electrical device of claim 1, wherein the electrical device is one of an electrical receptacle, a switch, a dimmer and a ground fault circuit interrupt (GFCI) receptacle.

3. The adjustably mountable electrical device of claim 1, wherein at least one electrical device mounting depth is adjustable by moving at least one of the yokes closer to or farther away from the electrical device face.

4. The adjustably mountable electrical device of claim 3, wherein the adjustment screw is threadedly coupled to at least two first brackets, one each coupled to one of each of the two yokes, the at least two first brackets each slidably coupled to one of at least two second brackets coupled to a strap of the electrical device, the strap extending from a first of the two opposing sides to a second of the two opposing sides.

5. The adjustably mountable electrical device of claim 1, further comprising a strap extending through the electrical device housing and being electrically coupled to a ground terminal of the electrical device, the strap being adjustably coupled to the yokes and fixed in its spatial relationship to the electrical device face.

6. The adjustably mountable electrical device of claim 5, wherein the at least one electrical device mounting depth is adjustable by adjusting a position of at least one yoke in relation to the strap.

7. The adjustably mountable electrical device of claim 6, wherein at least one yoke is slidably mounted to the electrical device housing through a channel and wherein the at least one electrical device mounting depth is adjustable by adjusting the yoke in the channel closer to or farther away from the electrical device face.

8. The adjustably mountable electrical device of claim 1, further comprising a strap extending through the electrical device housing and being electrically coupled to a ground terminal of the electrical device, the strap being fixedly coupled to or integral with the yokes and adjustably coupled to the electrical device housing such that at least a portion of the strap is moveable in relation to the device face to adjust the electrical device mounting depth.

9. The adjustably mountable electrical device of claim 1, wherein the yokes are fixedly coupled to the electrical device housing and the electrical device face is adjustably coupled to the electrical device housing such that at least a portion of the electrical device face is adjustable closer to or farther away from the yokes to adjust the electrical device mounting depth.

10. The adjustably mountable electrical device of claim 9, further comprising a strap extending through the electrical device housing and being electrically coupled to a ground terminal of the electrical device, the strap being fixedly coupled to or integral with the yokes.

11. The adjustably mountable electrical device of claim 10, further comprising at least one release button on a side of the electrical device housing, the electrical device face slidably coupled with the electrical device housing, the release button operatively associated with the electrical device face and electrical device housing to engage the electrical device face with the electrical device housing to permit and stop sliding movement of the electrical device face in relation to the electrical device housing.

12. The adjustably mountable electrical device of claim 1, wherein the yokes are adjustably mounted such that the electrical device mounting depths for the yokes are adjustable to increase or decrease the horizontal distance between the electrical device face and a portion of the electrical box mounting screw apertures of the yokes on the back side of the yokes.

* * * * *